US010327261B2

(12) United States Patent
Naghshvar et al.

(10) Patent No.: US 10,327,261 B2
(45) Date of Patent: Jun. 18, 2019

(54) DIRECTIONAL LISTEN BEFORE TALK SCHEME

(71) Applicant: QUALCOMM Incorporated, San Diego, CA (US)

(72) Inventors: Mohammad Naghshvar, San Diego, CA (US); Jing Sun, San Diego, CA (US); Tamer Kadous, San Diego, CA (US)

(*) Notice: Subject to any disclaimer, the term of this patent is extended or adjusted under 35 U.S.C. 154(b) by 56 days.

(21) Appl. No.: 15/656,842

(22) Filed: Jul. 21, 2017

(65) Prior Publication Data

US 2018/0213560 A1 Jul. 26, 2018

Related U.S. Application Data

(60) Provisional application No. 62/450,913, filed on Jan. 26, 2017.

(51) Int. Cl.
*H04B 7/00* (2006.01)
*H04W 74/08* (2009.01)

(52) U.S. Cl.
CPC .......... *H04W 74/0808* (2013.01); *H04B 7/00* (2013.01); *H04W 74/0816* (2013.01)

(58) Field of Classification Search
None
See application file for complete search history.

(56) References Cited

U.S. PATENT DOCUMENTS

| 2016/0037560 | A1 | 2/2016 | Liu et al. | |
| 2016/0173361 | A1* | 6/2016 | Somasundaram | H04L 43/16 370/328 |
| 2016/0192395 | A1 | 6/2016 | Yoo et al. | |
| 2018/0049241 | A1* | 2/2018 | Heo | H04W 74/0808 |
| 2018/0054835 | A1* | 2/2018 | Fodor | H04W 72/1205 |
| 2018/0077724 | A1* | 3/2018 | Kim | H04W 28/02 |
| 2018/0152954 | A1* | 5/2018 | Golitschek Edler Von Elbwart | H04W 74/0808 |
| 2018/0241588 | A1* | 8/2018 | Harada | H04W 16/14 |
| 2018/0249484 | A1* | 8/2018 | Kim | H04W 74/08 |
| 2018/0302203 | A1* | 10/2018 | Kim | H04J 11/00 |
| 2018/0302925 | A1* | 10/2018 | Wikstrom | H04L 1/00 |

OTHER PUBLICATIONS

International Search Report and Written Opinion—PCT/US2018/012519—ISA/EPO—dated Mar. 29, 2018.

* cited by examiner

*Primary Examiner* — Ajit Patel
(74) *Attorney, Agent, or Firm* — Holland & Hart LLP

(57) ABSTRACT

Methods, systems, and devices for wireless communication are described. A transmitting wireless device may select a direction for a wireless transmission over a channel The transmitting wireless device may monitor an availability of the channel in the selected direction for a duration of a first channel listening time corresponding to the selected direction. The transmitting wireless device may determine that the channel is available in the selected direction based on either an absence of channel reservation messages during the monitoring, or a first channel reservation message received during the monitoring. The first channel reservation message may indicate a permissibility of a simultaneous transmission in the selected direction. The transmitting wireless device may transmit a second channel reservation message to a receiving wireless device over the channel in the selected direction based on the determination that the channel is available in the selected direction.

30 Claims, 15 Drawing Sheets

DIRECTIONAL LISTEN BEFORE TALK SCHEME

CROSS REFERENCES

The present Application for Patent claims priority to U.S. Provisional Patent Application No. 62/450,913 by Naghshvar, et al., entitled "Directional Listen Before Talk Scheme," filed Jan. 26, 2017, assigned to the assignee hereof.

BACKGROUND

The following relates generally to wireless communication, and more specifically to a directional listen before talk scheme.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at mmW frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at mmW frequencies. Wireless communications between two wireless nodes, e.g., between a base station and a UE, may use beams or beamformed signals for transmission and/or reception.

Due to various limitations, e.g., limited number of communication chains, limited number of antennas, subarrays, etc., wireless devices cannot monitor channels in all directions at the same time. This creates a situation where the wireless device (e.g., base station, UE, etc.) determines which direction to monitor, how long to monitor any given direction, and the like. Additional concerns include, but are not limited to, which signals are exchanged between wireless devices for a given transmission and how to respond when the direction is determined busy or occupied.

SUMMARY

The described techniques relate to improved methods, systems, devices, or apparatuses that support a directional listen before talk (LBT) scheme. The described techniques may provide for the use of directional LBT timers maintained in multiple directions supported by a wireless device. Prior to transmitting a first transmission in a given direction, the wireless device may select a direction for wireless transmission over a channel, and monitor the availability of the channel in the selected direction. The monitoring may span a duration of a listening time corresponding to the selected direction. If the channel is available, the wireless device may send a transmitter-specific directional channel reservation message in the given direction over the channel. A receiver-specific directional channel reservation message may be received over the channel from an intended receiver in response to the transmitter-specific directional channel reservation. This exchange of directional channel reservation messages may provide the wireless device and the intended receiver access to the channel in the given direction.

To gain access to the channel in the given direction for subsequent transmissions, the wireless device may send an additional channel reservation message that uses a shorter time period (e.g., a short listen time). The channel may be considered busy if the wireless device detects transmitter and/or receiver-specific channel reservation messages between other wireless devices on the channel during the associated time period. In some aspects, the transmitting device may continue with the transmission in the direction when the detected channel reservation message includes an acceptable interference indicator and the transmit power for the transmission does not generate interference above the acceptable level.

A method of wireless communication is described. The method may include selecting, by a first wireless device, a direction for a wireless transmission over a channel, monitoring, by the first wireless device, an availability of the channel in the selected direction for a duration of a first channel listening time corresponding to the selected direction, determining that the channel is available in the selected direction based on either an absence of channel reservation messages during the monitoring or a first channel reservation message received during the monitoring, the first channel reservation message indicating a permissibility of a simultaneous transmission by the first wireless device in the selected direction, and transmitting, by the first wireless device, a second channel reservation message to a second wireless device over the channel in the selected direction based on the determination that the channel is available in the selected direction.

An apparatus for wireless communication is described. The apparatus may include means for selecting, by a first wireless device, a direction for a wireless transmission over a channel, means for monitoring, by the first wireless device, an availability of the channel in the selected direction for a duration of a first channel listening time corresponding to the selected direction, means for determining that the channel is available in the selected direction based on either an absence of channel reservation messages during the monitoring or a first channel reservation message received during the monitoring, the first channel reservation message indicating a permissibility of a simultaneous transmission by the first wireless device in the selected direction, and means for transmitting, by the first wireless device, a second channel reservation message to a second wireless device over the channel in the selected direction based on the determination that the channel is available in the selected direction.

Another apparatus for wireless communication is described. The apparatus may include a processor, memory in electronic communication with the processor, and instructions stored in the memory. The instructions may be operable to cause the processor to select, by a first wireless device, a direction for a wireless transmission over a channel, monitor, by the first wireless device, an availability of the channel in the selected direction for a duration of a first channel listening time corresponding to the selected direction, determine that the channel is available in the selected direction based on either an absence of channel reservation messages during the monitoring or a first channel reservation message received during the monitoring, the first channel reservation message indicating a permissibility of a simultaneous transmission by the first wireless device in the selected direction, and transmit, by the first wireless device, a second channel reservation message to a second wireless device over the channel in the selected direction based on the determination that the channel is available in the selected direction.

A non-transitory computer readable medium for wireless communication is described. The non-transitory computer-readable medium may include instructions operable to cause a processor to select, by a first wireless device, a direction for a wireless transmission over a channel, monitor, by the first wireless device, an availability of the channel in the selected direction for a duration of a first channel listening time corresponding to the selected direction, determine that the channel is available in the selected direction based on either an absence of channel reservation messages during the monitoring or a first channel reservation message received during the monitoring, the first channel reservation message indicating a permissibility of a simultaneous transmission by the first wireless device in the selected direction, and transmit, by the first wireless device, a second channel reservation message to a second wireless device over the channel in the selected direction based on the determination that the channel is available in the selected direction.

In some examples of the method, apparatus, and non-transitory computer-readable medium described above, the second channel reservation message includes at least one of a duration parameter for a subsequent data transmission, a power headroom parameter indicative of a transmit power for the subsequent data transmission, or combinations thereof.

Some examples of the method, apparatus, and non-transitory computer-readable medium described above may further include processes, features, means, or instructions for receiving a third channel reservation message from the second wireless device on the channel, in the selected direction and in response to the second channel reservation message. The third channel reservation message may comprise at least one of a duration parameter associated with a subsequent data transmission, a transmit power level indicator for the third channel reservation message, an acceptable interference level indicator for the second wireless device, or a combination thereof.

Some examples of the method, apparatus, and non-transitory computer-readable medium described above may further include processes, features, means, or instructions for transmitting, based at least in part on receiving the third channel reservation message, a data transmission to the second wireless device.

In some examples of the method, apparatus, and non-transitory computer-readable medium described above, the third channel reservation message includes at least one of a duration parameter associated with a subsequent data transmission, a transmit power level indicator for the third channel reservation message, an acceptable interference level indicator for the second wireless device, or a combination thereof.

Some examples of the method, apparatus, and non-transitory computer-readable medium described above may further include processes, features, means, or instructions for determining, based at least in part on the acceptable interference level indicator, an acceptable transmit power level for the subsequent data transmission.

In some examples of the method, apparatus, and non-transitory computer-readable medium described above, the third channel reservation message comprises a receiver-specific channel reservation message.

Some examples of the method, apparatus, and non-transitory computer-readable medium described above may further include processes, features, means, or instructions for determining, based at least in part on the determination that the channel may be available in the selected direction, a duration of a second channel listening time to monitor for a subsequent availability of the channel in the selected direction, where the duration of the second channel listening time may be less than the duration of the first channel listening time.

In some examples of the method, apparatus, and non-transitory computer-readable medium described above, the duration of the first channel listening time may be based at least in part on a data transmission interval associated with the channel.

Some examples of the method, apparatus, and non-transitory computer-readable medium described above may further include processes, features, means, or instructions for determining, based at least in part on the monitoring, that the channel may be not available in the selected direction. Some examples of the method, apparatus, and non-transitory computer-readable medium described above may further include processes, features, means, or instructions for refraining from transmitting the second channel reservation message.

Some examples of the method, apparatus, and non-transitory computer-readable medium described above may further include processes, features, means, or instructions for determining that a duration of a second channel listening time of a second channel, in a second direction, may be less than the duration of the first channel listening time, where the second channel in the second direction may be the same as the first channel in the first direction with respect to one of frequency and bandwidth. Some examples of the method, apparatus, and non-transitory computer-readable medium described above may further include processes, features, means, or instructions for monitoring, by the first wireless device, an availability of the second channel in the second direction for the duration of the second channel listening time.

In some examples of the method, apparatus, and non-transitory computer-readable medium described above, the duration of the second channel listening time duration may be a zero value.

In some examples of the method, apparatus, and non-transitory computer-readable medium described above, the second channel reservation message comprises a transmitter-specific channel reservation message.

A method of wireless communication is described. The method may include receiving, from a first wireless device, a transmitter-specific channel reservation message at a second wireless device, the transmitter-specific channel reservation message indicating that a directional LBT procedure was successful at the first wireless device, transmitting, by the second wireless device, a receiver-specific channel reservation message in response to the transmitter-specific channel reservation message, and receiving, by the second wireless device, a data transmission from the first wireless device based at least in part on the receiver-specific channel reservation message.

An apparatus for wireless communication is described. The apparatus may include means for receiving, from a first wireless device, a transmitter-specific channel reservation message at a second wireless device, the transmitter-specific channel reservation message indicating that a directional LBT procedure was successful at the first wireless device, means for transmitting, by the second wireless device, a receiver-specific channel reservation message in response to the transmitter-specific channel reservation message, and means for receiving, by the second wireless device, a data transmission from the first wireless device based at least in part on the receiver-specific channel reservation message.

Another apparatus for wireless communication is described. The apparatus may include a processor, memory in electronic communication with the processor, and instructions stored in the memory. The instructions may be operable to cause the processor to receive, from a first wireless device, a transmitter-specific channel reservation message at a second wireless device, the transmitter-specific channel reservation message indicating that a directional LBT procedure was successful at the first wireless device, transmit, by the second wireless device, a receiver-specific channel reservation message in response to the transmitter-specific channel reservation message, and receive, by the second wireless device, a data transmission from the first wireless device based at least in part on the receiver-specific channel reservation message.

A non-transitory computer readable medium for wireless communication is described. The non-transitory computer-readable medium may include instructions operable to cause a processor to receive, from a first wireless device, a transmitter-specific channel reservation message at a second wireless device, the transmitter-specific channel reservation message indicating that a directional LBT procedure was successful at the first wireless device, transmit, by the second wireless device, a receiver-specific channel reservation message in response to the transmitter-specific channel reservation message, and receive, by the second wireless device, a data transmission from the first wireless device based at least in part on the receiver-specific channel reservation message.

Some examples of the method, apparatus, and non-transitory computer-readable medium described above may further include processes, features, means, or instructions for performing a directional LBT procedure on the channel before transmitting the receiver-specific channel reservation message.

In some examples of the method, apparatus, and non-transitory computer-readable medium described above, the transmitter-specific channel reservation message comprises at least one of a duration parameter for the data transmission, a power headroom parameter indicative of a transmit power for the data transmission, or combinations thereof.

In some examples of the method, apparatus, and non-transitory computer-readable medium described above, the receiver-specific channel reservation message comprises at least one of a duration parameter associated with the data transmission, a transmit power level indicator for the receiver-specific channel reservation message, an acceptable interference level indicator for the second wireless device, or combinations thereof.

A method of wireless communication is described. The method may include selecting, by a first wireless device, a direction for a wireless transmission over a channel, monitoring, by the first wireless device, an availability of the channel in the selected direction for a duration of a first channel listening time corresponding to the selected direction, receiving a channel reservation message from an interfering wireless device during the monitoring, the channel reservation message indicating a duration of an interfering transmission, setting a timer associated with the selected direction based on the duration of the interfering transmission indicated in the channel reservation message, and monitoring, by the first wireless device, an availability of the channel in the selected direction for a duration of a second channel listening time corresponding to the selected direction in response based at least in part on an expiration of the timer, where the second channel listening time is shorter than the first channel listening time.

An apparatus for wireless communication is described. The apparatus may include means for selecting, by a first wireless device, a direction for a wireless transmission over a channel, means for monitoring, by the first wireless device, an availability of the channel in the selected direction for a duration of a first channel listening time corresponding to the selected direction, means for receiving a channel reservation message from an interfering wireless device during the monitoring, the channel reservation message indicating a duration of an interfering transmission, means for setting a timer associated with the selected direction based on the duration of the interfering transmission indicated in the channel reservation message, and means for monitoring, by the first wireless device, an availability of the channel in the selected direction for a duration of a second channel listening time corresponding to the selected direction in response based at least in part on an expiration of the timer, wherein the second channel listening time is shorter than the first channel listening time.

Another apparatus for wireless communication is described. The apparatus may include a processor, memory in electronic communication with the processor, and instructions stored in the memory. The instructions may be operable to cause the processor to select, by a first wireless device, a direction for a wireless transmission over a channel, monitor, by the first wireless device, an availability of the channel in the selected direction for a duration of a first channel listening time corresponding to the selected direction, receive a channel reservation message from an interfering wireless device during the monitoring, the channel reservation message indicating a duration of an interfering transmission, set a timer associated with the selected direction based on the duration of the interfering transmission indicated in the channel reservation message, and monitor, by the first wireless device, an availability of the channel in the selected direction for a duration of a second channel listening time corresponding to the selected direction in response based at least in part on an expiration of the timer, where the second channel listening time is shorter than the first channel listening time.

A non-transitory computer readable medium for wireless communication is described. The non-transitory computer-readable medium may include instructions operable to cause a processor to select, by a first wireless device, a direction for a wireless transmission over a channel, monitor, by the first wireless device, an availability of the channel in the selected direction for a duration of a first channel listening time corresponding to the selected direction, receive a channel reservation message from an interfering wireless device during the monitoring, the channel reservation message indicating a duration of an interfering transmission, set a timer associated with the selected direction based on the duration of the interfering transmission indicated in the channel reservation message, and monitor, by the first wireless device, an availability of the channel in the selected direction for a duration of a second channel listening time corresponding to the selected direction in response based at least in part on an expiration of the timer, where the second channel listening time is shorter than the first channel listening time.

In some examples of the method, apparatus, and non-transitory computer-readable medium described above, the channel reservation message from the interfering wireless device comprises a duration parameter indicating the duration of the interfering transmission.

Some examples of the method, apparatus, and non-transitory computer-readable medium described above may further include processes, features, means, or instructions for determining, based at least in part on the indicated duration, an end time for the interfering transmission. Some examples of the method, apparatus, and non-transitory computer-readable medium described above may further include processes, features, means, or instructions for setting the timer to expire at the end time for the interfering transmission.

Some examples of the method, apparatus, and non-transitory computer-readable medium described above may further include processes, features, means, or instructions for identifying one or more side lobes for communicating on the channel in the selected direction. Some examples of the method, apparatus, and non-transitory computer-readable medium described above may further include processes, features, means, or instructions for setting a timer for each of the one or more side lobes based on the duration of the interfering transmission indicated in the channel reservation message.

Some examples of the method, apparatus, and non-transitory computer-readable medium described above may further include processes, features, means, or instructions for determining the duration of the first channel listening time and the second channel listening time based at least in part on a data transmission interval associated with the channel.

Some examples of the method, apparatus, and non-transitory computer-readable medium described above may further include processes, features, means, or instructions for determining the duration of the first channel listening time and the second channel listening time based at least in part on a period associated with exchanging the transmitter-specific channel reservation message and the receiver-specific channel reservation message.

Some examples of the method, apparatus, and non-transitory computer-readable medium described above may further include processes, features, means, or instructions for determining the duration of the first channel listening time and the second channel listening time based at least in part on a data exchange interval associated with the channel, the data exchange interval comprising an exchange of channel reservation messages.

Some examples of the method, apparatus, and non-transitory computer-readable medium described above may further include processes, features, means, or instructions for determining the duration of one or both of the first channel listening time and the second channel listening time based at least in part on a random time period selected according to a channel reservation message collision avoidance scheme.

Some examples of the method, apparatus, and non-transitory computer-readable medium described above may further include processes, features, means, or instructions for determining a collision avoidance delay for the channel, wherein the duration of one or both of the first channel listening time and the second channel listening time may be based at least in part on collision avoidance delay.

DETAILED DESCRIPTION

Figure 1:
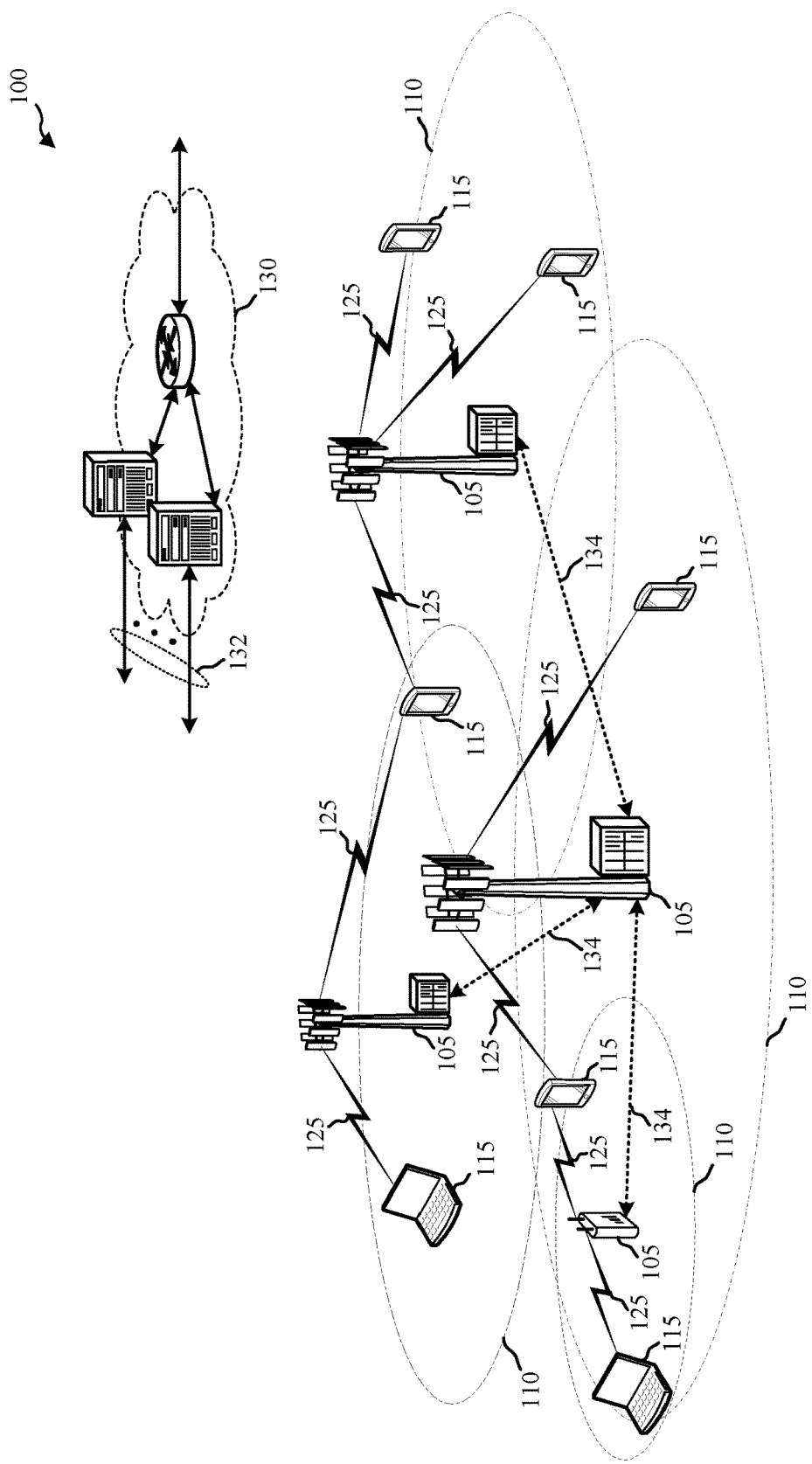
FIG. 1 illustrates an example of a system for wireless communication that supports a directional listen before talk (LBT) scheme in accordance with aspects of the present disclosure.

Wireless communication systems may have a configured data transmission interval that provides an access period for frame exchanges between wireless devices. One type of channel access may include a contention based access period (CBAP) where the wireless device performs a clear channel assessment (CCA) procedure, such as a listen before talk (LBT) procedure, before accessing the channel. Once the channel has been determined to be available, the wireless devices (e.g., the transmitting and receiving devices) may exchange various channel reservation messages that reserve the channel for a subsequent data transmission. When the channel is determined to be busy, conventional techniques provide for a backoff timer before the wireless device attempts to access the channel again. The backoff timer (or contention window) may be based on such things as a random time period selected to minimize collisions, a time period based on channel load (e.g., longer backoff periods for more congested channels), and the like. Such conventional protocols fail to address many issues arising in wireless communication systems using directional transmissions.

Aspects of the disclosure are initially described in the context of a wireless communications system. The described techniques may provide for devices (e.g., base stations and/or user equipment (UEs)) to maintain timers for each direction the device supports communicating on. Moreover, the devices may use different listening times based on recent communications in the direction, e.g., long channel listening times before initially communicating in a selected direction and then a shorter channel listening time before subsequently communicating in the same direction. Moreover, when the channel is determined busy, the devices may set timers for each direction that, in some examples, expire upon completion of an interfering communication. After the timer expires, the devices may attempt to grab the channel again for a data transmission.

For example, the transmitting wireless device may select the direction for the wireless transmission on the channel and monitor an availability of the channel throughout the long channel listening time. In some cases, the long channel listening time may correspond to the selected direction. The transmitting wireless device may determine that the channel is available based, for example, on not receiving any channel reservation messages exchanged between other wireless devices while monitoring. In another example, the transmitting wireless device may determine that the channel is available if the transmitting wireless device does receive a channel reservation message while monitoring, but the channel reservation message indicates that concurrent communications are supported. One manner in which concurrent communications might be supported, includes an acceptable interference level indication in the channel reservation message, where the transmitting wireless device may determine whether a data transmission at a given power level would generate interference above the acceptable level. If the channel is determined available, the transmitting wireless device may transmit a transmitter-specific channel reservation message to the intended receiving wireless device over the channel in the selected direction.

At the receiving end, the receiving wireless device may receive the transmitter-specific channel reservation message from the transmitting wireless device. Receipt of the transmitter-specific channel reservation message may provide an indication that the transmitting wireless device has successfully completed directional LBT procedure on the channel in the selected direction. In response, the receiving wireless device may transmit a receiver-specific channel reservation message to the transmitting wireless device and receive the data transmission from the transmitting wireless device over the channel in the selected direction.

Aspects of the disclosure are further illustrated by and described with reference to apparatus diagrams, system diagrams, and flowcharts that relate to directional LBT scheme.

FIG. 1 illustrates an example of a wireless communication system 100 in accordance with various aspects of the present disclosure. The wireless communication system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. As used herein, a wireless device, or simply device, may refer to a base station 105 and/or a UE 115.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be coupled with the P-GW. The P-GW may provide IP address allocation as well as other functions. The P-GW may be coupled with the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communication system 100 may operate in a ultra-high frequency (UHF) frequency region using frequency bands from 700 MHz to 2600 MHz (2.6 GHz), although in some cases wireless communication system 100 may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas and may implement beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communication system 100 may utilize both licensed and unlicensed radio frequency spectrum bands. For example, wireless communication system 100 may employ LTE License Assisted Access (LTE-LAA) radio access technology, LTE Unlicensed (LTE-U) radio access technology, or NR technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication system 100 may support one or more aspects of the described directional LBT scheme. For example, a transmitting wireless device (e.g., a base station 105 and/or UE 115) may select a direction for a wireless transmission over a channel. The transmitting wireless device may monitor an availability of the channel in the selected direction for a duration of a first channel listening time corresponding to the selected direction. The transmitting wireless device may determine that the channel is available in the selected direction based on one or both of an absence of channel reservation messages during the monitoring, or a channel reservation message received during the monitoring. The channel reservation message may indicate a permissibility of simultaneous transmission in the selected direction. Accordingly, the transmitting wireless device may transmit a channel reservation message to a second wireless device (e.g., a receiving wireless device such as a UE 115 and/or a base station 105) over the channel and in the selected direction.

The receiving wireless device may receive the channel reservation message from the transmitting wireless device, e.g., a transmitter-specific channel reservation message. The receiving wireless device may receive the channel reservation message based on successful resource access by the transmitting wireless device. The receiving wireless device may transmit a second channel reservation message (e.g., a receiver-specific channel reservation message) to the transmitting wireless device. In response, the receiving wireless device may receive a data transmission from the transmitting wireless device based on the exchanged channel reservation messages.

In some aspects, a transmitting wireless device may select the direction for the wireless transmission, monitor the availability of the channel for the duration of the first channel listen time in the direction and determine that the channel is not available. For example, the transmitting wireless device may receive a channel reservation message from an interfering wireless device during the monitoring (e.g., from a wireless device other than the receiving wireless device). The channel reservation message may indicate a duration of the interfering transmission (e.g., a duration field, network allocation vector (NAV), etc.). The transmitting wireless device may set a timer associated with the selected direction based on the duration of the interfering transmission. The transmitting wireless device may again monitor for the availability of the channel in the selected direction for a duration of a second channel listening time based on the expiration of the timer. The second channel listen time may be different from the first channel listen time, e.g., may be shorter.

Figure 2:
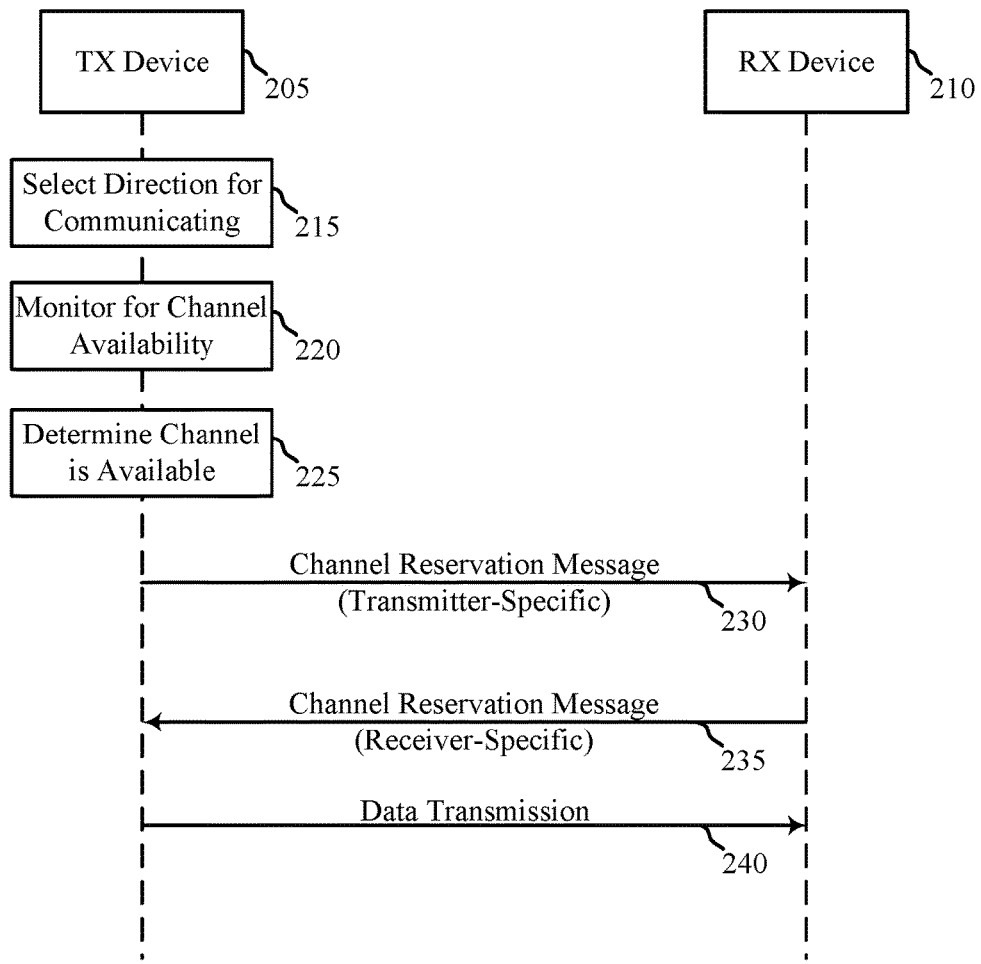
FIG. 2 illustrates an example of a process that supports a directional LBT scheme in accordance with aspects of the present disclosure.

FIG. 2 illustrates an example of a process 200 for a directional LBT scheme. Process 200 may implement aspect (s) of wireless communication system 100 of FIG. 1. Process 200 may include a transmitting wireless device (TX device) 205 and a receiving wireless device (RX device) 210. The transmitting wireless device 205 and the receiving wireless device 210 may be examples of a base station 105 and/or a UE 115, as described herein.

Process 200 illustrates an example use of timers for a corresponding direction selected for transmission on a channel. For example, some or all of the devices in a wireless communication system may maintain separate timers for each direction the device supports communicating on. The timers may be used during a LBT procedure and/or a backoff period on the channel in the selected direction, and the duration of the timers may vary. The timers may improve channel access in the direction, reduce latency for the data transmissions on the channel in the selected direction, and the like.

At 215, transmitting wireless device 205 may select a direction for a wireless transmission over a channel. The wireless transmission over the channel may be a beamformed transmission, such as in a mmW wireless communication system. The selected direction may also include corresponding side lobe(s), e.g., directions available for wireless transmissions that are on either side of the selected direction, include a wider or more narrow beam width, involve a different beam shape, and the like.

At 220, transmitting wireless device 205 may monitor an availability of the channel in the selected direction and a duration of the first channel listening time that corresponds to the selected direction. For example, transmitting wireless device 205 may maintain a timer for the selected direction, and the timer may be set to the first channel listening time. The first channel listening time may, in some aspects, be considered a long channel listening time.

Transmitting wireless device 205 may select or otherwise determine the first channel listening time in various manners. In some aspects, the first channel listening time may be based on a data transmission interval associated with the channel. The data transmission interval may include or otherwise define an access period for frame exchanges between devices on the channel. In some cases, there may be one data transmission interval per beacon interval.

In some aspects, the first channel listening time may be based on the maximum channel access time (MCAT). For example, in considering the data transmission interval for the channel, the transmitting wireless device 205 may select a first channel listening time based on some considerations. As one example, a nominal MCAT may include a duration of the first channel listening time which extends beyond a single data transmission interval, e.g., that is long enough to receive at least two beacons during the first channel listening time. While the nominal MCAT may provide lower interference/more reliability, the nominal MCAT may be associated increased overhead costs. In another example, the duration of the first channel listening time may be less than the MCAT, e.g., shorter than the period between successive beacons on the channel. While a channel duration less than the MCAT may reduce the overhead costs, a higher collision rate may be seen due to increased chances of missing channel reservation messages on the channel in the selected direction. Another example may include the duration of the first channel listening time being less than the MCAT, and using repeated channel reservation messages (e.g., multiple instances of transmitter-specific and receiver-specific channel reservation messages). While the method may reduce the chances of interference, increased overhead costs may be seen due to the added channel reservation messaging. Transmitting wireless device 205 may consider such factors when selecting the first channel listening time, e.g., latency requirements, reliability, priority, etc., associated with the data transmission.

Monitoring for the availability of the channel in the selected direction may include performing a LBT procedure, or some other contention-based channel access procedure, on the channel and in the selected direction. Monitoring may include detecting ongoing channel reservation message exchanges (e.g., at least one of a transmitter-specific channel reservation message or a receiver-specific channel reservation message) from other wireless devices on the channel.

At 225, transmitting wireless device 205 may determine an availability of the channel in the selected direction. For example, transmitting wireless device 205 may determine that the channel is available in the selected direction based on an absence of channel reservation messages on the channel during the monitoring or based on receiving a first channel reservation message during the monitoring. The first channel reservation message may include a permissibility of a simultaneous transmission by the transmitting wireless device 205 in the selected direction.

In some aspects, the first channel reservation message may be from a wireless device other than the receiving wireless device 210, e.g., an interfering wireless device. The first channel reservation message may be a transmitter-specific channel reservation message or a receiver-specific channel reservation message. The first channel reservation message may include a duration parameter associated with an interfering transmission between the interfering wireless device and another wireless device, e.g., a duration parameter indicative of the interfering transmission, a NAV, or some other information indicative of the duration of the interfering transmission.

In some aspects, the permissibility of the simultaneous transmission may include a power headroom indicator and/or an acceptable interference level indicator for the interfering wireless device. Transmitting wireless device 205 may use the power headroom indicator to determine what transmit power will be used for interfering transmission, e.g., with reference to the transmit power level of the received first channel reservation message. Transmitting wireless device 205 may use the acceptable interference level indicator to determine what transmit power to use for subsequent data transmission on the channel in the selected direction. If the transmit power of the transmitting wireless device 205 does generate interference that would exceed the acceptable interference level of the interfering wireless device, transmitting wireless device 205 may determine that the channel is available and can be used for a simultaneous transmission.

In some aspects, determining the channel is available in the selected direction may include transmitting wireless device 205 receiving, decoding, or otherwise detecting any channel reservation messages during the monitoring, e.g., during the duration of the first channel listening time. As discussed, the channel may also be considered available in the selected direction when the received first channel reservation message indicates that simultaneous transmission is supported. The channel may be considered busy or otherwise not available when the there is an ongoing transmission on the channel and the simultaneous transmission is not supported. If the channel was determined to be busy, transmitting wireless device 205 may use the duration indicator from the first channel reservation message to set a timer for the channel in the corresponding direction, e.g., a backoff timer for the direction. For ease of reference, the channel will be considered available at 225.

At 230, transmitting wireless device 205 may transmit a second channel reservation message to the receiving wireless device 210 over the channel and in the selected direction. The second channel reservation message may include a transmitter-specific channel reservation message. In one example, the second channel reservation message may be a channel reservation-transmitter (CR-T) message. The second channel reservation message may include a duration parameter for a subsequent data transmission from transmitting wireless device 205 and to receiving wireless device 210, a power headroom parameter indicative of the transmit power to be used for the subsequent data transmission, and the like. The duration parameter may include a timing value, timing window, data buffer size indication, or other information indicative of the duration of the subsequent data transmission. In one example, the duration parameter may include a NAV field.

In some aspects, the power headroom parameter may be the difference between the transmit power of the second channel reservation message and the transmit power designated for the subsequent data transmission, e.g., the actual transmit power level for the data transmission, an increased power level for the data transmission (e.g., 3 dB), or some other indication of the amount of transmit power to be used for the subsequent data transmission. Thus, a potential victim receiver/transmitter may use the received power level of the second channel reservation message and the power headroom parameter to determine how much interference can be expected during the data transmission.

In some aspects, given the power headroom parameter, a potential victim receiver/transmitter may compute what will be the received interference level during the subsequent data transmission. In the situation where the interference level is not sensed, the victim receiver/transmitter may assume that the ongoing channel reservation message exchange was unsuccessful and that the channel is not busy.

At 230, receiving wireless device 210 may receive the transmitter-specific channel reservation message. Receiving the transmitter-specific channel reservation message may provide an indication that transmitting wireless device 205 has successfully completed a LBT procedure, e.g., the monitoring of the channel for the first channel listening time and determination that the channel is available in the selected direction.

At 235, receiving wireless device 210 may respond by transmitting a third channel reservation message (e.g., a receiver-specific channel reservation message) to transmitting wireless device 205. In some aspects, receiving wireless device 210 may perform a LBT procedure on the channel and in the selected direction, before transmitting the third channel reservation message. The receiver-specific channel reservation message may include the duration parameter (e.g., from the second channel reservation message), a transmit power level indicator for the receiver-specific channel reservation message, and an acceptable interference level indicator for the receiving wireless device 210.

In some aspects, given the transmit power of the receiver-specific channel reservation message, a potential aggressor transmitting wireless device may compute the path loss and the interference level the transmitting wireless device may generate. Given an acceptable interference level, the aggressor transmitter may perform power backoff procedures and, when power backoff is not permitted, delay transmission for the duration of the subsequent data transmission.

At 240, transmitting wireless device 205 may transmit a data transmission to receiving wireless device 210 based at least in part on the channel reservation message exchange. The duration of the data transmission may correspond to the duration parameter indicated in the channel reservation messages. The transmit power of the data transmission may correspond to the power headroom indicated in the transmitter-specific channel reservation message.

Figure 3:
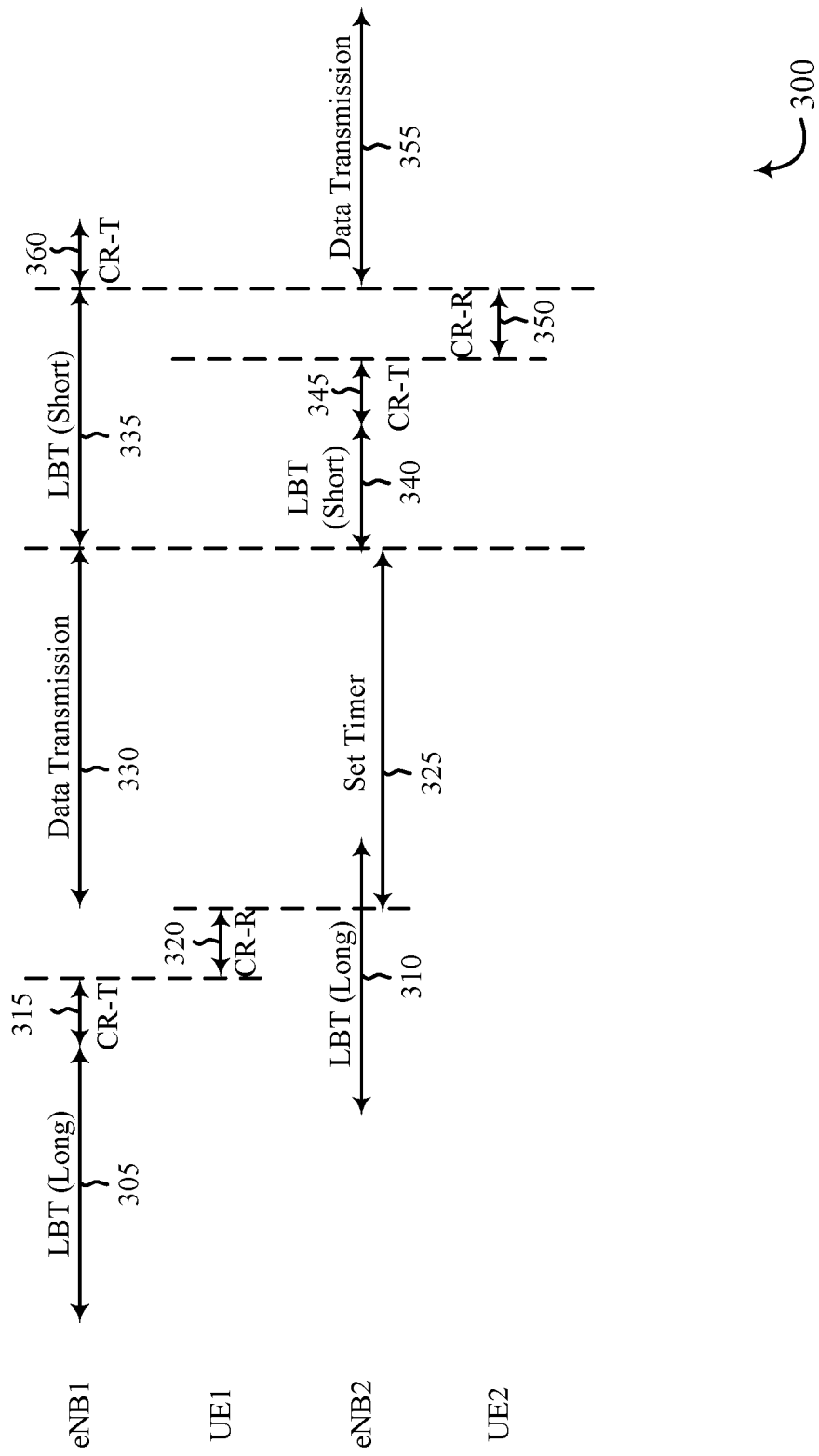
FIG. 3 illustrates an example of a timing diagram that supports a directional LBT scheme in accordance with aspects of the present disclosure.

FIG. 3 illustrates an example of a timing diagram 300 for a directional LBT scheme. Timing diagram 300 may implement aspect(s) of wireless communication system 100 and/or process 200 of FIGS. 1 and 2, respectively. For example, a transmitting wireless device and/or receiving wireless device, which may be examples of a base station 105 and/or UE 115 described herein, may perform function(s) implementing aspects of timing diagram 300.

eNB1 is configured for wireless transmissions on a channel in a selected direction to UE1 and eNB2 is configured for wireless transmissions on a channel in another selected direction to UE2. Timing diagram 300 illustrates example implementations of the described techniques for direction LBT schemes. It is to be understood that the described techniques are not limited to the examples of timing diagram 300 and that other examples are also within the scope of the present disclosure. Moreover, timing diagram 300 illustrates examples where the eNBs are acting as the transmitting wireless devices and the UEs are acting as the receiving wireless devices. However, as is presently described, a transmitting wireless device may correspond to base stations or UEs and a receiving wireless device may also correspond to base stations or UEs.

At 305, eNB1 may select a direction for wireless transmission over a channel to UE1 and therefore monitor an availability of the channel in the selected direction. eNB1 may monitor the channel using a LBT procedure that has a duration corresponding to the long channel listening time (e.g., the first channel listening time discussed above). The duration of the long channel listening time may be selected according to the techniques described herein. In some aspects, eNB1 may have a timer associated with the direction that corresponds to the duration of the LBT procedure.

At 310, eNB2 may also select a direction for wireless transmission over a channel to UE2 and therefore monitor an availability of the channel in the selected direction. eNB2 may monitor the channel using a LBT procedure that has a duration corresponding to the long channel listening time (e.g., the first channel listening time discussed above). The duration for the long channel listening time may be selected according to the techniques described herein. As illustrated in timing diagram 300, eNB2 may start the LBT procedure after eNB1 initiates LBT procedure. In some aspects, eNB2 may have a timer associated with the direction that corresponds to the duration of the LBT procedure.

It is to be understood that the channels and/or directions selected for wireless transmission between eNB1/UE1 and eNB2/UE2 may be different, but may have similar characteristics that can cause interference. For example, eNB1 and eNB2 may be neighboring base stations, cells, etc., such that transmissions having certain frequencies, direction, bandwidth, transmit power, etc., from the eNBs may introduce interference into the neighboring eNB. Similarly, UE1 and UE2 may be neighbors or otherwise located in close enough proximity that transmissions having certain frequencies, direction, bandwidth, transmit power, etc., from one UE may introduce interference into the neighboring UE. Moreover, transmissions from eNB1 may introduce interference into UE2 and/or transmissions from UE1 may introduce interference into eNB2.

At 315, eNB1 may have successfully complete a LBT procedure and transmit a transmitter-specific channel reservation message (CR-T) to UE1. eNB1 and eNB2 may be separated a sufficient distance, have obstacles between the eNBs, and the like, such that eNB2 does not receive the transmitter-specific channel reservation message during the LBT procedure of eNB2. As discussed above, the transmitter-specific channel reservation message may include a duration parameter, a power headroom indicator, and the like.

At 320 and in response to receiving the transmitter-specific channel reservation message, UE1 may transmit a receiver-specific channel reservation message (CR-R) to eNB1. The receiver-specific channel reservation message may include the duration indicator, the transmit power level indicator of the CR-R message, an acceptable interference level indicator, and the like.

In some cases, UE1 may be close enough and/or transmit the CR-R message with sufficient power such that eNB2 may receive the receiver-specific channel reservation message. eNB2 may be performing LBT procedure when the receiver-specific channel reservation message is received and determine that the channel is not available. Therefore, at 325, eNB2 may set a timer for a backoff window for the selected direction. In some aspects, eNB2 may decode the receiver-specific channel reservation message and read the duration indicator. eNB2 may set the timer based on the duration parameter such that the timer expires at or near the same time as the data transmission ends.

eNB1 may receive the receiver-specific channel reservation message from UE1 and begin the data transmission at 330. The data transmission may have a duration corresponding to the duration parameter and a transmit power level corresponding to the power headroom indicator, as conveyed in the CR-T message.

At 335 and 340, both eNB1 and eNB2, respectively, may initiate a second LBT procedure and monitor the respective channels in the respective selected directions. The monitoring in the second LBT procedures by eNB1 and eNB2 may use a short channel listening time. In some cases, eNB1 may know when the data transmission ends. The short channel listening time may be selected to have a duration shorter than the duration of the long channel listening time that occurred at 305. Similarly, eNB2 may know when the data transmission ends. The short channel listening time may be selected to have a duration shorter than the duration of the long channel listening time that occurred at 310. In some examples, the short channel listening times may be randomly selected.

In the example timing diagram 300 the short channel listening time of eNB2 may be shorter than the short channel listening time of eNB1. Therefore, eNB2 may complete LBT procedure and transmit a transmitter-specific channel reservation message at 345 to UE2. As UE1 is able to receive transmissions from eNB2, UE1 may receive and decode the CR-T transmitted at 345 and determine a data transmission from eNB2 to UE2 may follow the transmission at 345.

At 350, UE2 may respond to the transmitter-specific channel reservation message at 345 by transmitting a receiver-specific channel reservation message to eNB2. In response, at 355 eNB2 may start the data transmission on the channel in the selected direction to UE2.

eNB1 may complete a short LBT procedure and transmit a transmitter-specific channel reservation message to UE1 at 360. UE1, however, having received the CR-T message from eNB2 at 345 may not respond to the CR-T message from eNB1 at 360. Failing to receive a CR-R message from UE1, eNB1 may determine that the channel is not available in the selected direction and start a backoff timer for the channel.

Timing diagram 300 provides examples of methods for transmitting wireless devices and receiving wireless devices to access a channel in selected directions using the described techniques for directional LBT schemes. In some aspects, the transmitting wireless device may have various options when a channel is determined to be busy.

For example, if the current direction is found to be busy, the transmitting wireless device may stay on this direction until the channel in the selected direction is determined available. Once the channel has been determined available and used for the data transmission, the transmitting wireless device may switch to the short channel listening time for subsequent LBT procedures. This may support continued monitoring of this direction and may improve the chances of detecting CR-T/CR-R exchanges.

In another example, the transmitting wireless device may switch to different direction that has an associated lower or non-zero timer value (e.g., shorter channel listening time) if there is a UE to be served on a channel in the different direction. The transmitting wireless device may wait for the short channel listening time until the timer reaches zero. Waiting, however, may result in missed CR-T/CR-R exchanges on the initially selected direction, while the transmitting wireless device monitors/communicates on the channel in the other direction. The number of missed exchanges may be reduced, however, depending on the number of Tx/Rx pairs on each direction.

In yet another example, the transmitting wireless device may select a new direction with an expired timer and monitor for the long channel listening time. The transmitting wireless device can make the determination based on the timer values and the difference between average listening times for the long channel listening time and short channel listening time, as well as the priority of the UEs that need to be served on the channel in the new direction.

Another consideration relates to beam selection. The LBT procedure may be performed on the same beam that the data transmission is intended to use. However, if the beam information has not been updated in the last beam valid time, the transmitting wireless device may select one of several options. A first option may include if the UE is in the cell center (e.g., high signal-to-noise ratio (SNR)) and a coarser beam is available, the transmitting wireless device may use a coarser beam for the LBT procedure and data transmission. The link may be closed, taking into account the reduction in antenna gain due to selecting a course beam. A second option may include, for example, if the UE is at the cell edge (e.g., low SNR) or in the cell center but no coarse beam is available, the transmitting wireless device may first perform LBT on the last updated beam followed by LBT on adjacent beams. A third option is if no CR-R is received on any of the directions, the transmitting wireless device may refrain from scheduling this UE until the beam info is updated. As can be appreciated, the beam valid time may be UE specific and take lower values for UEs with high mobility.

Figure 4:
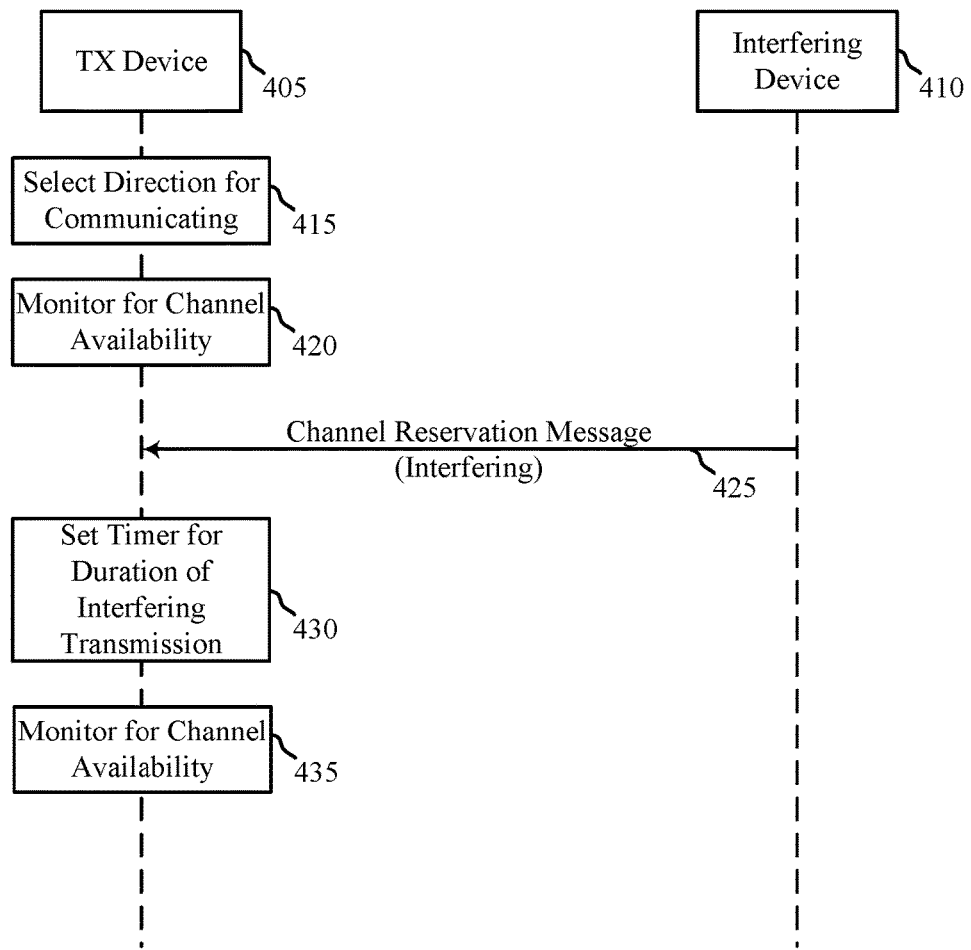
FIG. 4 illustrates an example of a process that supports a directional LBT scheme in accordance with aspects of the present disclosure.

FIG. 4 illustrates an example of a process 400 for a directional LBT procedure. Process 400 may implement aspect(s) of wireless communication system 100 of FIG. 1, process 200 of FIG. 2, and/or timing diagram 300 of FIG. 3. Process 400 may include a transmitting wireless device 405 and an interfering wireless device 410. Transmitting wireless device 405 and interfering wireless device 410 may be examples of a base station 105 and/or a UE 115, as described herein.

Process 400 illustrates an example implementation of timers for a corresponding direction selection and transmission on a channel. For example, some or all of the devices in a wireless communication system may maintain separate timers for each direction the device supports communicating on. The timers may be used during one or more LBT procedures and/or as backoff timers on the channel in the selected direction, and the duration of the timers may vary. The timers may improve channel access in the direction, may reduce latency for the data transmissions, and the like.

At 415, transmitting wireless device 405 may select a direction for a wireless transmission over a channel. For example, the wireless transmission over the channel may be a beamformed transmission, such as in a mmW wireless communication system. The selected direction may also include corresponding side lobe(s), e.g., directions available for wireless transmissions that are on either side of the selected direction, have a wider or more narrow beam width, have a different beam shape, etc.

At 420, transmitting wireless device 405 may monitor the channel for availability in the selected direction, and for a duration of the first channel listening time corresponding to the selected direction. For example, the transmitting wireless device 405 may maintain a timer for the selected direction and the timer may be set to the first channel listening time. The first channel listening time may, in some aspects, considered a long channel listening time.

Transmitting wireless device 405 may select or otherwise determine the first channel listening time in various manners. In some aspects, the first channel listening time may be based on a data transmission interval associated with the channel. The data transmission interval may include or otherwise define an access period for frame exchanges between devices on the channel. There may be one data transmission interval per beacon interval.

Monitoring for the availability of the channel in the selected direction may include performing a LBT procedure, or some other contention-based channel access procedure, on the channel and in the selected direction. Monitoring may include detecting ongoing channel reservation message exchanges (e.g., at least one of a transmitter-specific channel reservation message or a receiver-specific channel reservation message from an interfering wireless device).

At 425, transmitting wireless device 405 may receive a channel reservation message from interfering wireless device 410. The channel reservation message may include a duration parameter indicating a duration of an interfering transmission (e.g., a transmission between interfering wireless device 410 and another wireless device).

At 430, transmitting wireless device 405 may set a timer associated with the selected direction based at least on the duration of the interfering transmission (e.g., as indicated in the duration parameter of the channel reservation message from interfering wireless device 410). Transmitting wireless device 405 may set the timer to expire at or near the end of the interfering data transmission.

At 435, transmitting wireless device 405 may monitor the channel. Transmitting wireless device 405 may determine an availability of the channel in the selected direction and for a duration of the second channel listening time corresponding to the selected direction. For example, transmitting wireless device 405 may maintain a timer for the selected direction and the timer may be set to the second channel listening time. The second channel listening time may, in some aspects, be considered a short channel listening time. Transmitting wireless device 405 may monitor for the availability of the channel in the selected direction in response to the timer expiring.

In some aspects, the first and/or second channel listening times may be based on the data transmission interval, based on a collision avoidance delay value, based on random time period selected according to a collision avoidance scheme (e.g., based on the time associated with the channel reservation message exchanges), and the like.

Figure 5:
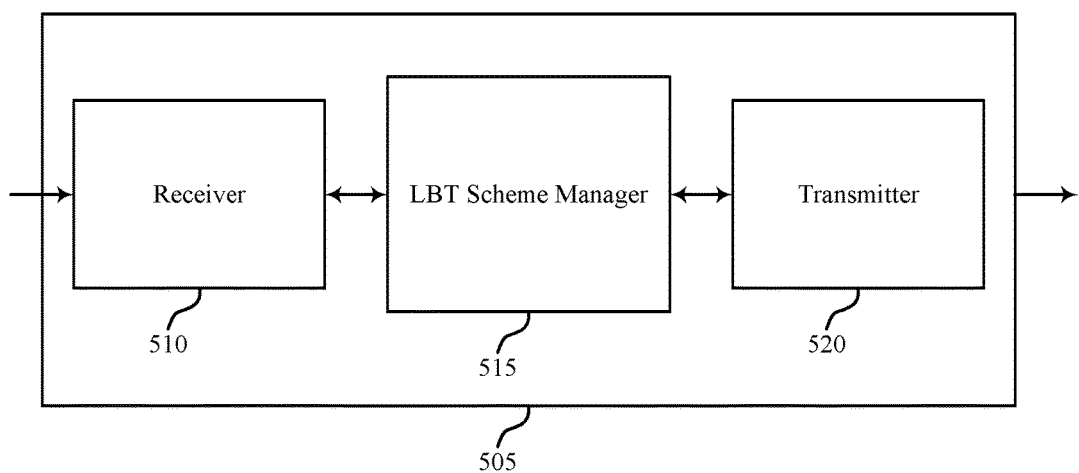
FIGS. 5 through 7 illustrate block diagrams of a device that supports a directional LBT scheme in accordance with aspects of the present disclosure.

FIG. 5 shows a block diagram 500 of a wireless device 505 that supports a directional LBT scheme in accordance with various aspects of the present disclosure. Wireless device 505 may be an example of aspects of a UE 115 or base station 105 as described herein. Wireless device 505 may be an example of a transmitting wireless device and/or a receiving wireless device as described herein. Wireless device 505 may include a receiver 510, a LBT scheme manager 515, and a transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to directional LBT scheme, etc.). Information may be passed on to other components of the device. The receiver 510 may be an example of aspects of the transceiver 835 described with reference to FIG. 8.

LBT scheme manager 515 may be an example of aspects of the LBT scheme manager 815 described with reference to FIG. 8. LBT scheme manager 515 and/or at least some of its various sub-components may be implemented in hardware, software executed by a processor, firmware, or any combination thereof. If implemented in software executed by a processor, the functions of the LBT scheme manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The LBT scheme manager 515 and/or at least some of its various sub-components may be physically located at various positions, including being distributed such that portions of functions are implemented at different physical locations by one or more physical devices. In some examples, LBT scheme manager 515 and/or at least some of its various sub-components may be a separate and distinct component in accordance with various aspects of the present disclosure. In other examples, LBT scheme manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, wireless device 505 may be configured as a transmitting wireless device, and LBT scheme manager 515 may select, by a first wireless device, a direction for a wireless transmission over a channel. LBT scheme manager 515 may monitor, by the first wireless device, an availability of the channel in the selected direction for a duration of a first channel listening time corresponding to the selected direction. LBT scheme manager 515 may determine that the channel is available in the selected direction based on either an absence of channel reservation messages during the monitoring or a first channel reservation message received during the monitoring, the first channel reservation message indicating a permissibility of a simultaneous transmission by the first wireless device in the selected direction. LBT scheme manager 515 may transmit, by the first wireless device, a second channel reservation message to a second wireless device over the channel in the selected direction based on the determination that the channel is available in the selected direction.

In some cases, wireless device 505 may be configured as a transmitting wireless device, and LBT scheme manager 515 may receive, from a first wireless device, a transmitter-specific channel reservation message at a second wireless device, the transmitter-specific channel reservation message indicating that a directional LBT procedure was successful at the first wireless device. LBT scheme manager 515 may transmit, by the second wireless device, a receiver-specific channel reservation message in response to the transmitter-specific channel reservation message. LBT scheme manager 515 may receive, by the second wireless device, a data transmission from the first wireless device based on the receiver-specific channel reservation message.

In some cases, wireless device 505 may be configured as a transmitting wireless device, and the LBT scheme manager 515 may select, by a first wireless device, a direction for a wireless transmission over a channel. LBT scheme manager 515 may monitor, by the first wireless device, an availability of the channel in the selected direction for a duration of a first channel listening time corresponding to the selected direction. LBT scheme manager 515 may receive a channel reservation message from an interfering wireless device during the monitoring, the channel reservation message indicating a duration of an interfering transmission, set a timer associated with the selected direction based on the duration of the interfering transmission indicated in the channel reservation message. LBT scheme manager 515 may monitor, by the first wireless device, an availability of the channel in the selected direction for a duration of a second channel listening time corresponding to the selected direction in response based on an expiration of the timer, where the second channel listening time is shorter than the first channel listening time.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna or a set of antennas.

Figure 6:
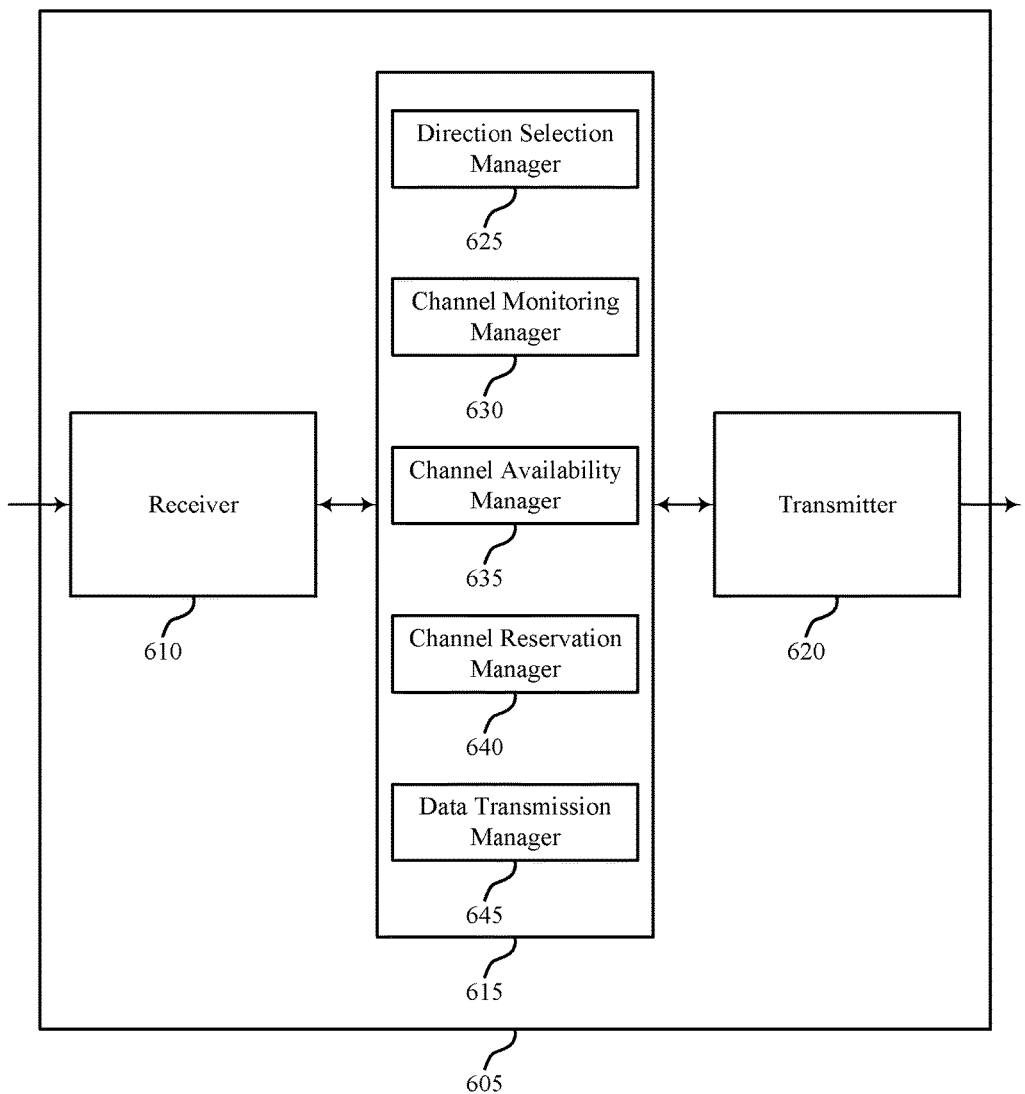

FIG. 6 shows a block diagram 600 of a wireless device 605 that supports a directional LBT scheme in accordance with various aspects of the present disclosure. Wireless device 605 may be an example of aspects of a wireless device 505 or a UE 115 or base station 105 as described herein. Wireless device 605 may be an example of a transmitting wireless device and/or a receiving wireless device as described herein. Wireless device 605 may include a receiver 610, a LBT scheme manager 615, and a transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to directional LBT scheme, etc.). Information may be passed on to other components of the device. The receiver 610 may be an example of aspects of the transceiver 835 described with reference to FIG. 8.

LBT scheme manager 615 may be an example of aspects of the LBT scheme manager 815 described with reference to FIG. 8. LBT scheme manager 615 may also include a direction selection manager 625, a channel monitoring manager 630, a channel availability manager 635, a channel reservation manager 640, and a data transmission manager 645.

Direction selection manager 625 may select, by a first wireless device, a direction for a wireless transmission over a channel. Direction selection manager 625 may identify one or more side lobes for communicating on the channel in the selected direction.

Channel monitoring manager 630 may monitor, by the first wireless device, an availability of the channel in the selected direction for a duration of a first channel listening time corresponding to the selected direction. Channel monitoring manager 630 may monitor, by the first wireless device, an availability of the second channel in the second direction for the duration of the second channel listening time. Channel monitoring manager 630 may perform a directional LBT procedure on the channel before transmitting the receiver-specific channel reservation message. Channel monitoring manager 630 may monitor, by the first wireless device, an availability of the channel in the selected direction for a duration of a second channel listening time corresponding to the selected direction based on an expiration of the timer, where the second channel listening time is shorter than the first channel listening time.

Channel availability manager 635 may determine that the channel is available in the selected direction based on either an absence of channel reservation messages during the monitoring or a first channel reservation message received during the monitoring, the first channel reservation message may indicate a permissibility of a simultaneous transmission by the first wireless device in the selected direction. Channel availability manager 635 may determine, based on the monitoring, that the channel is not available in the selected direction.

Channel reservation manager 640 may transmit, by the first wireless device, a second channel reservation message to a second wireless device over the channel in the selected direction based on the determination that the channel is available in the selected direction. Channel reservation manager 640 may determine a collision avoidance delay for the channel, where the duration of one or both of the first channel listening time and the second channel listening time may be based on a collision avoidance delay. Channel reservation manager 640 may receive a third channel reservation message from the second wireless device, on the channel and in the selected direction, in response to the second channel reservation message. Channel reservation manager 640 may determine, based on the determination that the channel is available in the selected direction spanning the duration of the second channel listening time, to monitor for a subsequent availability of the channel in the selected direction.

Channel reservation manager 640 may refrain from transmitting the second channel reservation message. Channel reservation manager 640 may determine that a duration of a second channel listening time of a second channel in a second direction is less than the duration of the first channel listening time, where the second channel in the second direction occupies at least the same frequency or bandwidth as the first channel. Channel reservation manager 640 may receive, from a first wireless device, a transmitter-specific channel reservation message at a second wireless device, the transmitter-specific channel reservation message indicating that a directional LBT procedure was successful at the first wireless device. Channel reservation manager 640 may receive a channel reservation message from an interfering wireless device during the monitoring, the channel reservation message indicating a duration of an interfering transmission. Channel reservation manager 640 may set a timer associated with the selected direction based on the duration of the interfering transmission indicated in the channel reservation message. Channel reservation manager 640 may determine the duration of the first channel listening time and the second channel listening time based at least on a data transmission interval associated with the channel.

Channel reservation manager 640 may determine, based on the indicated duration, an end time for the interfering transmission. Channel reservation manager 640 may set the timer to expire at the end time for the interfering transmission. Channel reservation manager 640 may set a timer for each of the one or more side lobes based on the duration of the interfering transmission indicated in the channel reservation message. Channel reservation manager 640 may determine the duration of the first channel listening time and the second channel listening time based on a period associated with exchanging the transmitter-specific channel reservation message and the receiver-specific channel reservation message. Channel reservation manager 640 may determine the duration of one or both of the first channel listening time and the second channel listening time based on a random time period selected according to a channel reservation message collision avoidance scheme. Channel reservation manager 640 may transmit, by the second wireless device, a receiver-specific channel reservation message in response to the transmitter-specific channel reservation message. In some cases, the third channel reservation message includes at least one of a duration parameter associated with a subsequent data transmission, a transmit power level indicator for the third channel reservation message, an acceptable interference level indicator for the second wireless device, or combinations thereof. In some cases, the third channel reservation message includes a receiver-specific channel reservation message.

In some cases, the duration of the first channel listening time is based on a data transmission interval associated with the channel. In some cases, the duration of the second channel listening time duration is a zero value. In some cases, the second channel reservation message includes a transmitter-specific channel reservation message. In some cases, the second channel reservation message includes at least one of a duration parameter for a subsequent data transmission, a power headroom parameter indicative of a transmit power for the subsequent data transmission, or combinations thereof. In some cases, the transmitter-specific channel reservation message includes at least one of a duration parameter for the data transmission, a power headroom parameter indicative of a transmit power for the data transmission, or combinations thereof. In some cases, the receiver-specific channel reservation message includes at least one of a duration parameter associated with the data transmission, a transmit power level indicator for the receiver-specific channel reservation message, an acceptable interference level indicator for the second wireless device, or combinations thereof. In some cases, the channel reservation message from the interfering wireless device includes a duration parameter indicating the duration of the interfering transmission.

Data transmission manager 645 may transmit, based on receiving the third channel reservation message, a data transmission to the second wireless device. Data transmission manager 645 may receive, by the second wireless device, a data transmission from the first wireless device based on the receiver-specific channel reservation message.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna or a set of antennas.

Figure 7:
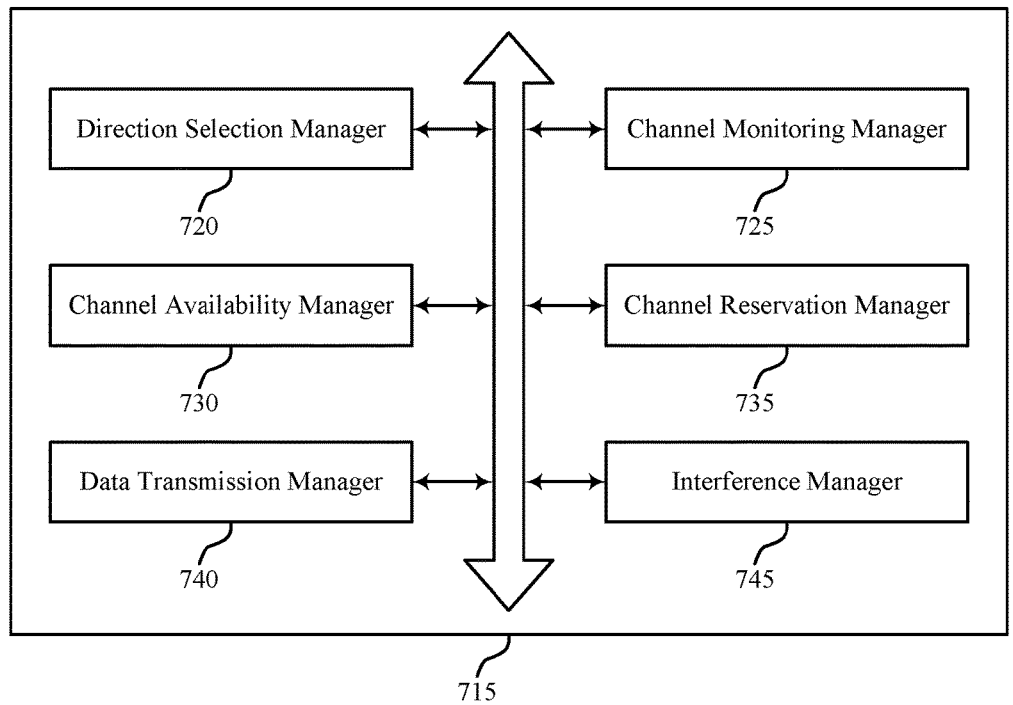

FIG. 7 shows a block diagram 700 of a LBT scheme manager 715 that supports a directional LBT scheme in accordance with various aspects of the present disclosure. The LBT scheme manager 715 may be an example of aspects of a LBT scheme manager 515, a LBT scheme manager 615, or a LBT scheme manager 815 described with reference to FIGS. 5, 6, and 8. The LBT scheme manager 715 may include a direction selection manager 720, a channel monitoring manager 725, a channel availability manager 730, a channel reservation manager 735, a data transmission manager 740, and an interference manager 745. Each of these modules may communicate, directly or indirectly, with one another (e.g., via one or more buses).

Direction selection manager 720 may select, by a first wireless device, a direction for a wireless transmission over a channel and identify one or more side lobes for communicating on the channel in the selected direction.

Channel monitoring manager 725 may monitor, by the first wireless device, an availability of the channel in the selected direction for a duration of a first channel listening time corresponding to the selected direction. Channel monitoring manager 725 may monitor, by the first wireless device, an availability of the second channel in the second direction for the duration of the second channel listening time. Channel monitoring manager 725 may monitor, by the first wireless device, an availability of the channel in the selected direction for a duration of a second channel listening time corresponding to the selected direction in response based on an expiration of the timer, where the second channel listening time is shorter than the first channel listening time.

In some cases, channel availability manager 730 may determine that the channel is available in the selected direction based on either an absence of channel reservation messages during the monitoring, or a first channel reservation message received during the monitoring. Further, the first channel reservation message may indicate a permissibility of a simultaneous transmission by the first wireless device in the selected direction. In other cases, channel availability manager 730 may determine, based on the monitoring, that the channel is not available in the selected direction.

Channel reservation manager 735 may transmit, by the first wireless device, a second channel reservation message to a second wireless device over the channel, in the selected direction, based on the determination that the channel is available in the selected direction. Channel reservation manager 735 may determine a collision avoidance delay for the channel, where the duration of one or both of the first channel listening time and the second channel listening time are based on the collision avoidance delay. Channel reservation manager 735 may receive a third channel reservation message from the second wireless device on the channel in the selected direction in response to the second channel reservation message.

Channel reservation manager 735 may determine, based on the determination that the channel is available in the selected direction, a duration of a second channel listening time to monitor for a subsequent availability of the channel in the selected direction, where the duration of the second channel listening time is less than the duration of the first channel listening time. Channel reservation manager 735 may refrain from transmitting the second channel reservation message. Channel reservation manager 735 may determine that a duration of a second channel listening time of a second channel in a second direction is less than the duration of the first channel listening time, where the second channel in the second direction occupies at least the same frequency or bandwidth as the first channel in the first direction.

Channel reservation manager 735 may receive, from a first wireless device, a transmitter-specific channel reservation message at a second wireless device, the transmitter-specific channel reservation message indicating that a directional LBT procedure was successful at the first wireless device. Channel reservation manager 735 may receive a channel reservation message from an interfering wireless device during the monitoring, the channel reservation message indicating a duration of an interfering transmission. Channel reservation manager 735 may set a timer associated with the selected direction based on the duration of the interfering transmission indicated in the channel reservation message. Channel reservation manager 735 may determine the duration of the first channel listening time and the second channel listening time based on a data transmission interval associated with the channel.

Channel reservation manager 735 may determine, based on the indicated duration, an end time for the interfering transmission. Channel reservation manager 735 may set the timer to expire at the end time for the interfering transmission. Channel reservation manager 735 may set a timer for each of the one or more side lobes based on the duration of the interfering transmission indicated in the channel reservation message. Channel reservation manager 735 may determine the duration of the first channel listening time and the second channel listening time based on a period associated with exchanging the transmitter-specific channel reservation message and the receiver-specific channel reservation message. Channel reservation manager 735 may determine the duration of one or both of the first channel listening time and the second channel listening time based on a random time period selected according to a channel reservation message collision avoidance scheme. Channel reservation manager 735 may transmit, by the second wireless device, a receiver-specific channel reservation message in response to the transmitter-specific channel reservation message.

In some cases, the third channel reservation message includes at least one of a duration parameter associated with a subsequent data transmission, a transmit power level indicator for the third channel reservation message, an acceptable interference level indicator for the second wireless device, or combinations thereof. In some cases, the third channel reservation message includes a receiver-specific channel reservation message. In some cases, the duration of the first channel listening time is based on a data transmission interval associated with the channel. In some cases, the duration of the second channel listening time duration is a zero value. In some cases, the second channel reservation message includes a transmitter-specific channel reservation message. In some cases, the second channel reservation message includes at least one of a duration parameter for a subsequent data transmission, a power headroom parameter indicative of a transmit power for the subsequent data transmission, or combinations thereof.

In some cases, the transmitter-specific channel reservation message includes at least one of a duration parameter for the data transmission, a power headroom parameter indicative of a transmit power for the data transmission, or combinations thereof. In some cases, the receiver-specific channel reservation message includes at least one of a duration parameter associated with the data transmission, a transmit power level indicator for the receiver-specific channel reservation message, an acceptable interference level indicator for the second wireless device, or combinations thereof. In some cases, the channel reservation message from the interfering wireless device includes a duration parameter indicating the duration of the interfering transmission.

Data transmission manager 740 may transmit, based on receiving the third channel reservation message, a data transmission to the second wireless device. Data transmission manager 740 may receive, by the second wireless device, a data transmission from the first wireless device based on the receiver-specific channel reservation message.

Interference manager 745 may determine, based on the acceptable interference level indicator, an acceptable transmit power level for the subsequent data transmission.

Figure 8:
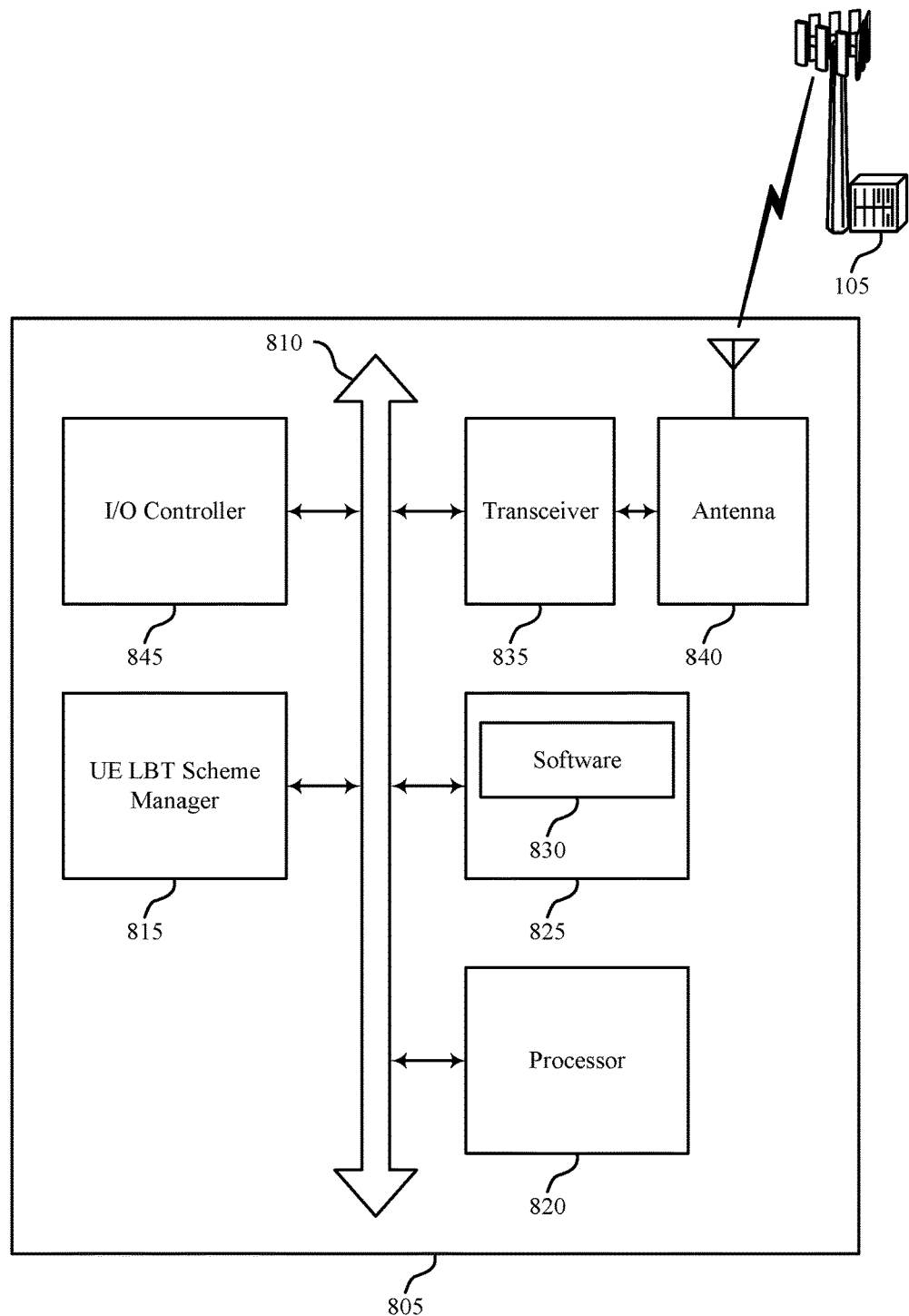
FIG. 8 illustrates a block diagram of a system including a user equipment that supports a directional LBT scheme in accordance with aspects of the present disclosure.

FIG. 8 shows a diagram of a system 800 including a device 805 that supports directional LBT procedure in accordance with various aspects of the present disclosure. Device 805 may be an example of or include the components of wireless device 505, wireless device 605, a transmitting wireless device, a receiving wireless device, or a UE 115 as described above, e.g., with reference to FIGS. 1 through 6. Device 805 may include components for bi-directional voice and data communications including components for transmitting and receiving communications, including a UE LBT scheme manager 815, a processor 820, a memory 825, a software 830, a transceiver 835, an antenna 840, and an I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, a FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting a directional LBT scheme).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
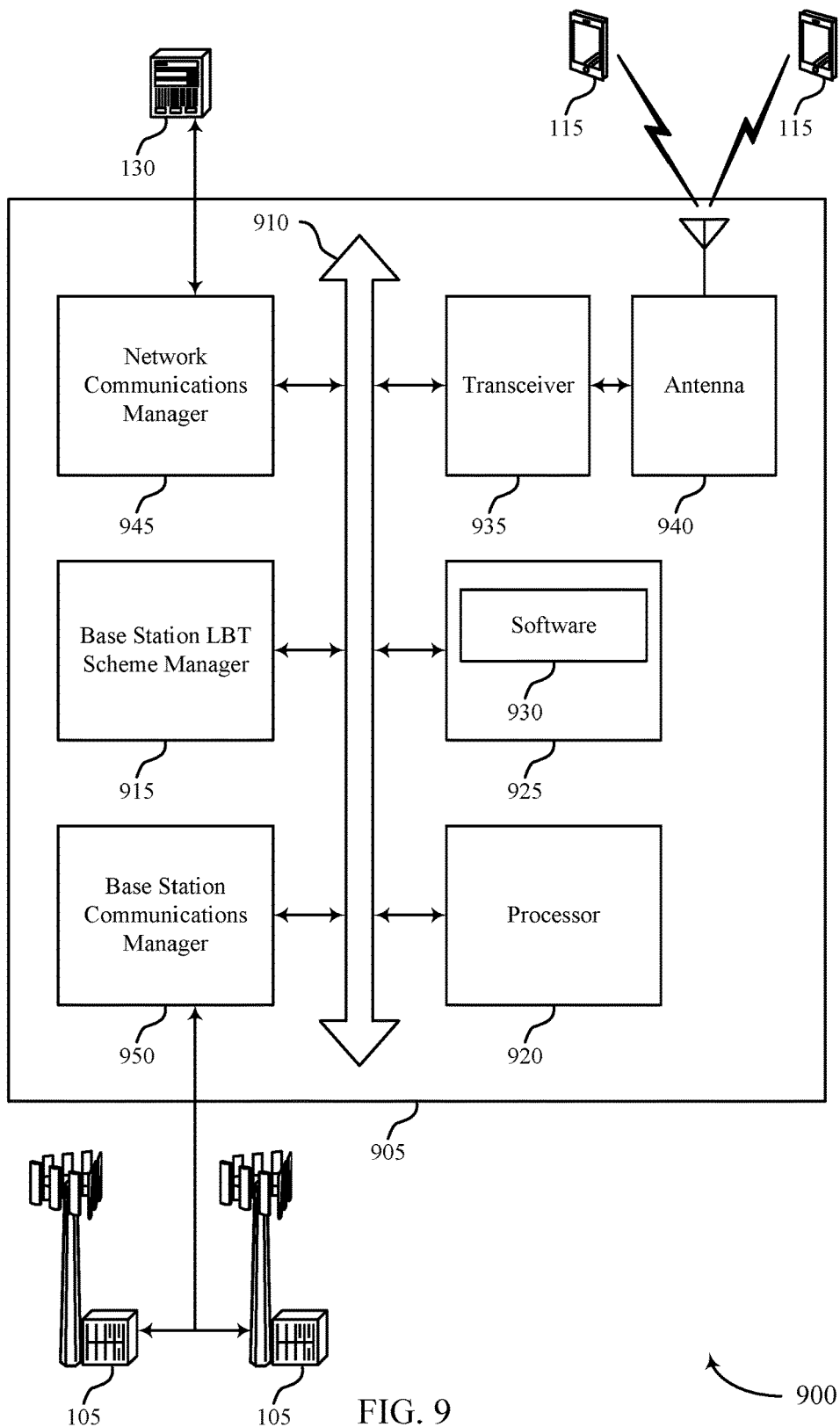
FIG. 9 illustrates a block diagram of a system including a base station that supports a directional LBT scheme in accordance with aspects of the present disclosure.

FIG. 9 shows a diagram of a system 900 including a device 905 that supports a directional LBT scheme in accordance with various aspects of the present disclosure. Device 905 may be an example of or include the components of wireless device 605, wireless device 705, a transmitting wireless device, a receiving wireless device, or a base station 105 as described above, e.g., with reference to FIGS. 1 through 6. Device 905 may include components for bi-directional voice and data communications including components for transmitting and receiving communications, including a base station LBT scheme manager 915, a processor 920, a memory 925, a software 930, a transceiver 935, an antenna 940, a network communications manager 945, and a base station communications manager 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting directional LBT scheme).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware and/or software operation such as the interaction with peripheral components or devices.

Software 930 may include code to implement aspects of the present disclosure, including code to support directional LBT scheme. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within a LTE/LTE-A wireless communication network technology to provide communication between base stations 105.

Figure 10:
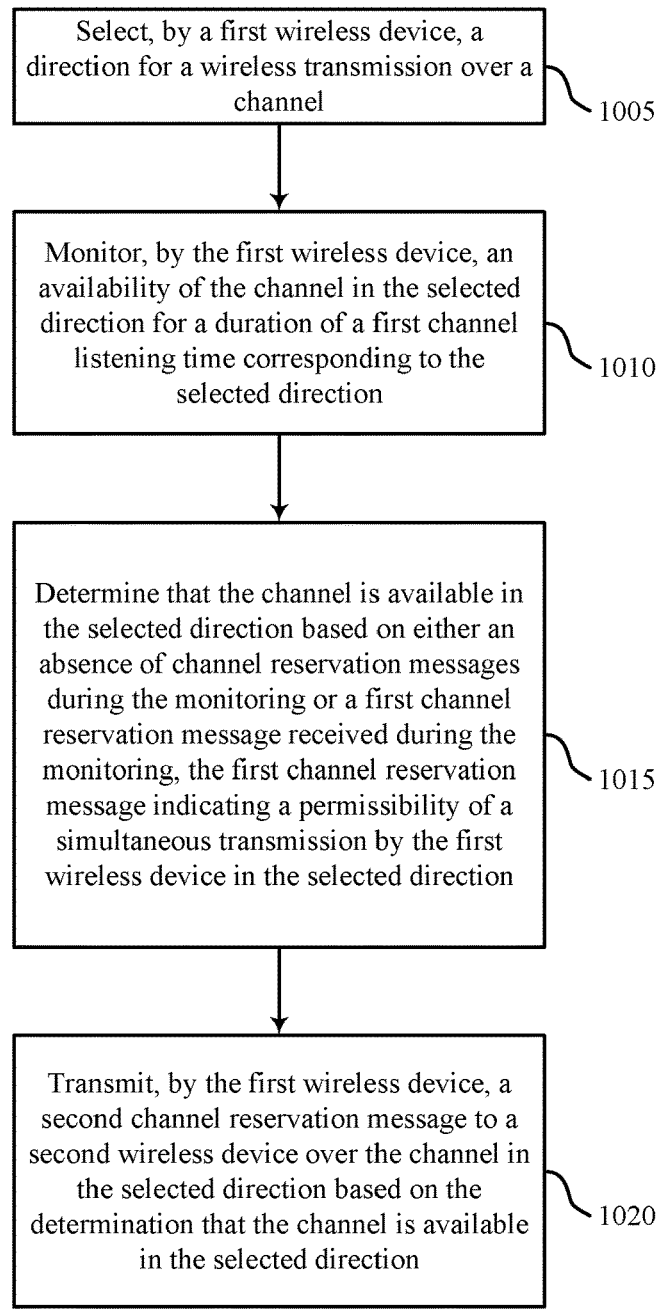
FIGS. 10 through 15 illustrate methods for a directional LBT in accordance with aspects of the present disclosure.

FIG. 10 shows a flowchart illustrating a method 1000 for a directional LBT scheme in accordance with various aspects of the present disclosure. The operations of method 1000 may be implemented by a UE 115 or base station 105 or its components as described herein. For example, the operations of method 1000 may be performed by a LBT scheme manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005 the UE 115 or base station 105 may select, by a first wireless device, a direction for a wireless transmission over a channel. The operations of block 1005 may be performed according to the methods described with reference to FIGS. 1 through 4. In some examples, aspects of the operations of block 1005 may be performed by a direction selection manager as described with reference to FIGS. 5 through 7.

At block 1010 the UE 115 or base station 105 may monitor, by the first wireless device, an availability of the channel in the selected direction for a duration of a first channel listening time corresponding to the selected direction. The operations of block 1010 may be performed according to the methods described with reference to FIGS. 1 through 4. In some examples, aspects of the operations of block 1010 may be performed by a channel monitoring manager as described with reference to FIGS. 5 through 7.

At block 1015 the UE 115 or base station 105 may determine that the channel is available in the selected direction based on either an absence of channel reservation messages during the monitoring or a first channel reservation message received during the monitoring, the first channel reservation message indicating a permissibility of a simultaneous transmission by the first wireless device in the selected direction. The operations of block 1015 may be performed according to the methods described with reference to FIGS. 1 through 4. In some examples, aspects of the operations of block 1015 may be performed by a channel availability manager as described with reference to FIGS. 5 through 7.

At block 1020 the UE 115 or base station 105 may transmit, by the first wireless device, a second channel reservation message to a second wireless device over the channel in the selected direction based on the determination that the channel is available in the selected direction. The operations of block 1020 may be performed according to the methods described with reference to FIGS. 1 through 4. In some examples, aspects of the operations of block 1020 may be performed by a channel reservation manager as described with reference to FIGS. 5 through 7.

Figure 11:
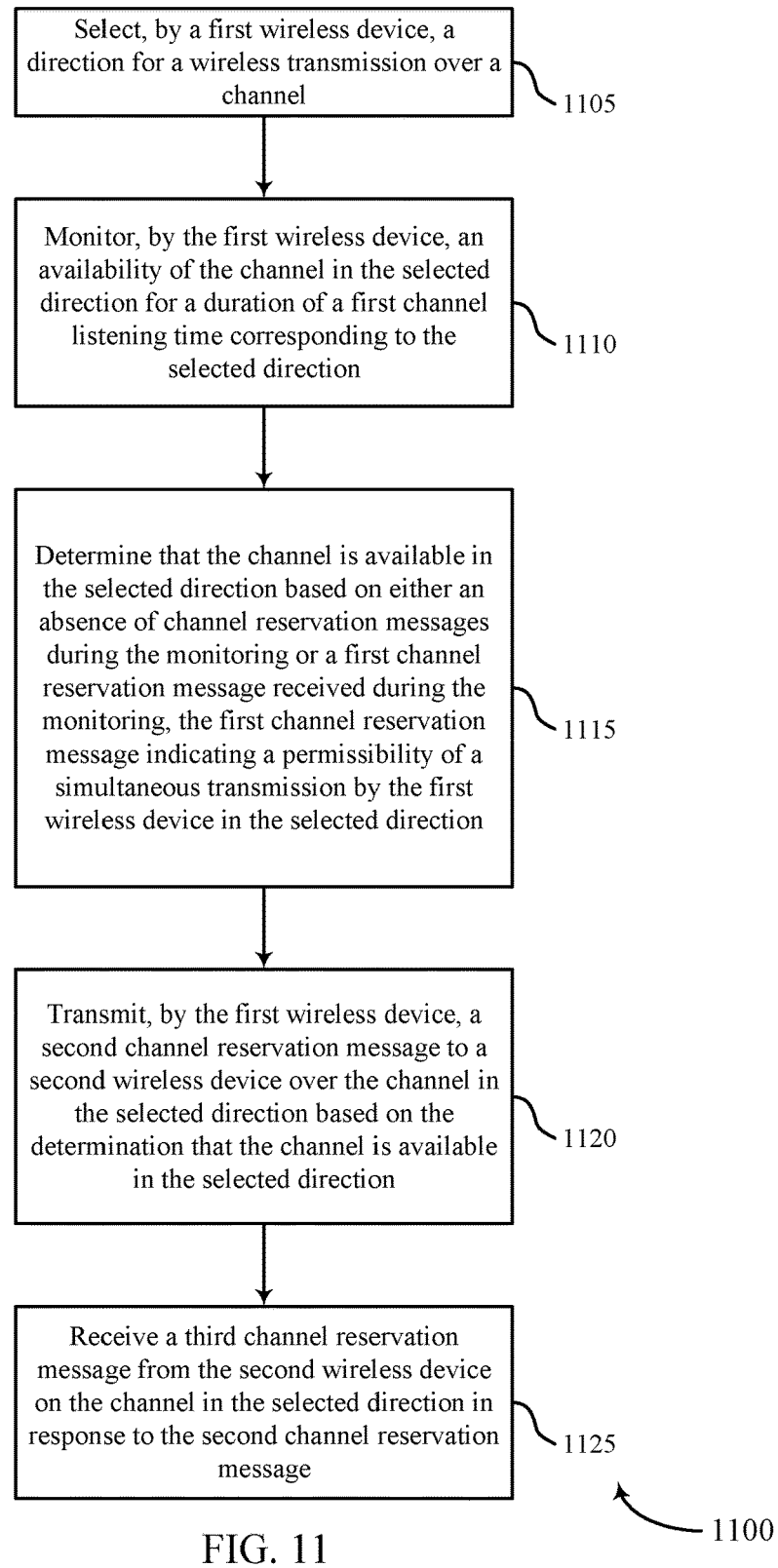

FIG. 11 shows a flowchart illustrating a method 1100 for a directional LBT scheme in accordance with various aspects of the present disclosure. The operations of method 1100 may be implemented by a UE 115 or base station 105 or its components as described herein. For example, the operations of method 1100 may be performed by a LBT scheme manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may select, by a first wireless device, a direction for a wireless transmission over a channel. The operations of block 1105 may be performed according to the methods described with reference to FIGS. 1 through 4. In some examples, aspects of the operations of block 1105 may be performed by a direction selection manager as described with reference to FIGS. 5 through 7.

At block 1110 the UE 115 or base station 105 may monitor, by the first wireless device, an availability of the channel in the selected direction for a duration of a first channel listening time corresponding to the selected direction. The operations of block 1110 may be performed according to the methods described with reference to FIGS. 1 through 4. In some examples, aspects of the operations of block 1110 may be performed by a channel monitoring manager as described with reference to FIGS. 5 through 7.

At block 1115 the UE 115 or base station 105 may determine that the channel is available in the selected direction based on either an absence of channel reservation messages during the monitoring or a first channel reservation message received during the monitoring, the first channel reservation message indicating a permissibility of a simultaneous transmission by the first wireless device in the selected direction. The operations of block 1115 may be performed according to the methods described with reference to FIGS. 1 through 4. In some examples, aspects of the operations of block 1115 may be performed by a channel availability manager as described with reference to FIGS. 5 through 7.

At block 1120 the UE 115 or base station 105 may transmit, by the first wireless device, a second channel reservation message to a second wireless device over the channel in the selected direction based on the determination that the channel is available in the selected direction. The operations of block 1120 may be performed according to the methods described with reference to FIGS. 1 through 4. In some examples, aspects of the operations of block 1120 may be performed by a channel reservation manager as described with reference to FIGS. 5 through 7.

At block 1125 the UE 115 or base station 105 may receive a third channel reservation message from the second wireless device on the channel in the selected direction in response to the second channel reservation message. The operations of block 1125 may be performed according to the methods described with reference to FIGS. 1 through 4. In some examples, aspects of the operations of block 1125 may be performed by a channel reservation manager as described with reference to FIGS. 5 through 7.

Figure 12:
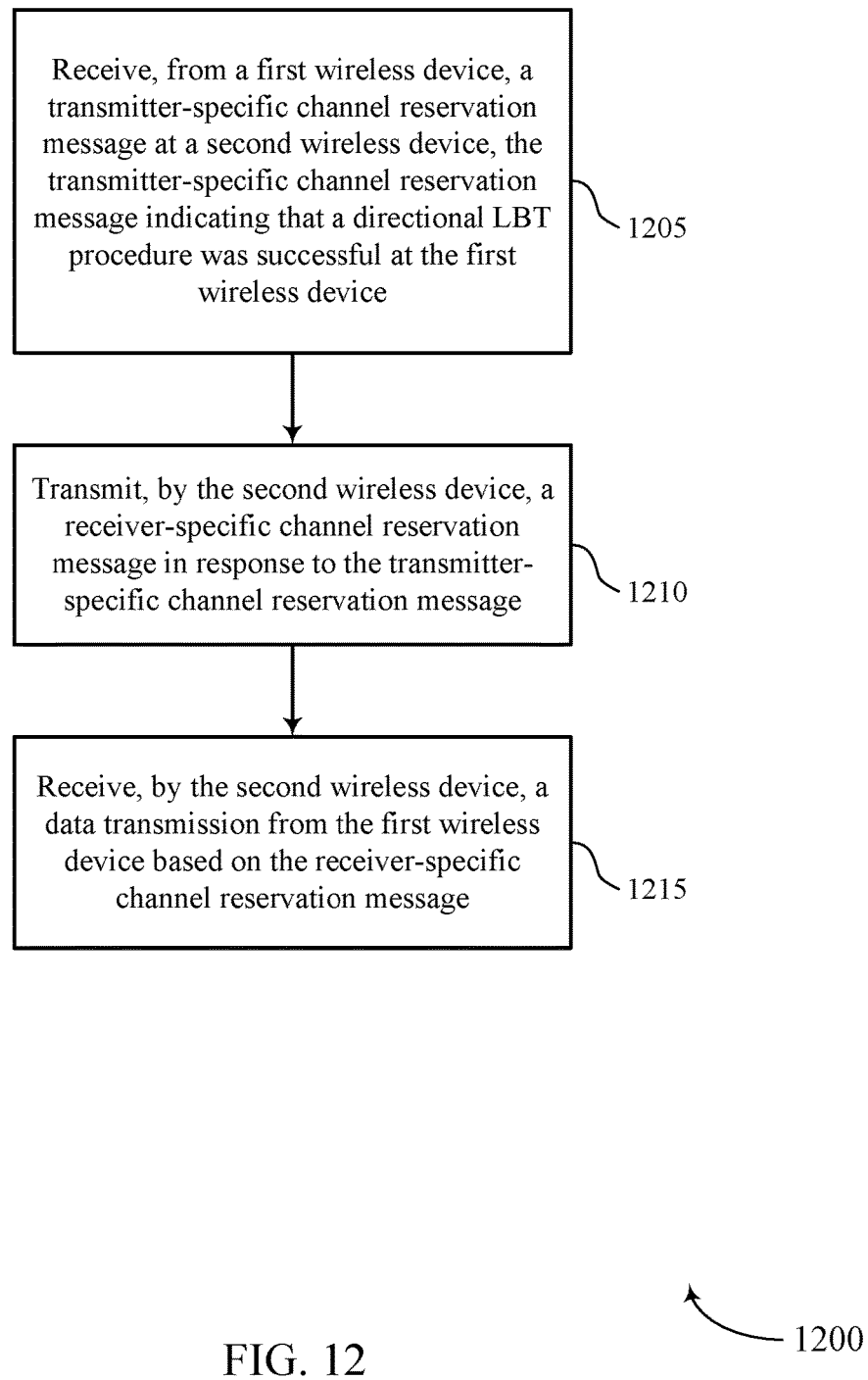

FIG. 12 shows a flowchart illustrating a method 1200 for a directional LBT scheme in accordance with various aspects of the present disclosure. The operations of method 1200 may be implemented by a UE 115 or base station 105 or its components as described herein. For example, the operations of method 1200 may be performed by a LBT scheme manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may receive, from a first wireless device, a transmitter-specific channel reservation message at a second wireless device, the transmitter-specific channel reservation message indicating that a directional listen-before-talk (LBT) procedure was successful at the first wireless device. The operations of block 1205 may be performed according to the methods described with reference to FIGS. 1 through 4. In certain examples, aspects of the operations of block 1205 may be performed by a channel reservation manager as described with reference to FIGS. 5 through 7.

At block 1210 the UE 115 or base station 105 may transmit, by the second wireless device, a receiver-specific channel reservation message in response to the transmitter-specific channel reservation message. The operations of block 1210 may be performed according to the methods described with reference to FIGS. 1 through 4. In certain examples, aspects of the operations of block 1210 may be performed by a channel reservation manager as described with reference to FIGS. 5 through 7.

At block 1215 the UE 115 or base station 105 may receive, by the second wireless device, a data transmission from the first wireless device based at least in part on the receiver-specific channel reservation message. The operations of block 1215 may be performed according to the methods described with reference to FIGS. 1 through 4. In certain examples, aspects of the operations of block 1215 may be performed by a data transmission manager as described with reference to FIGS. 5 through 7.

Figure 13:
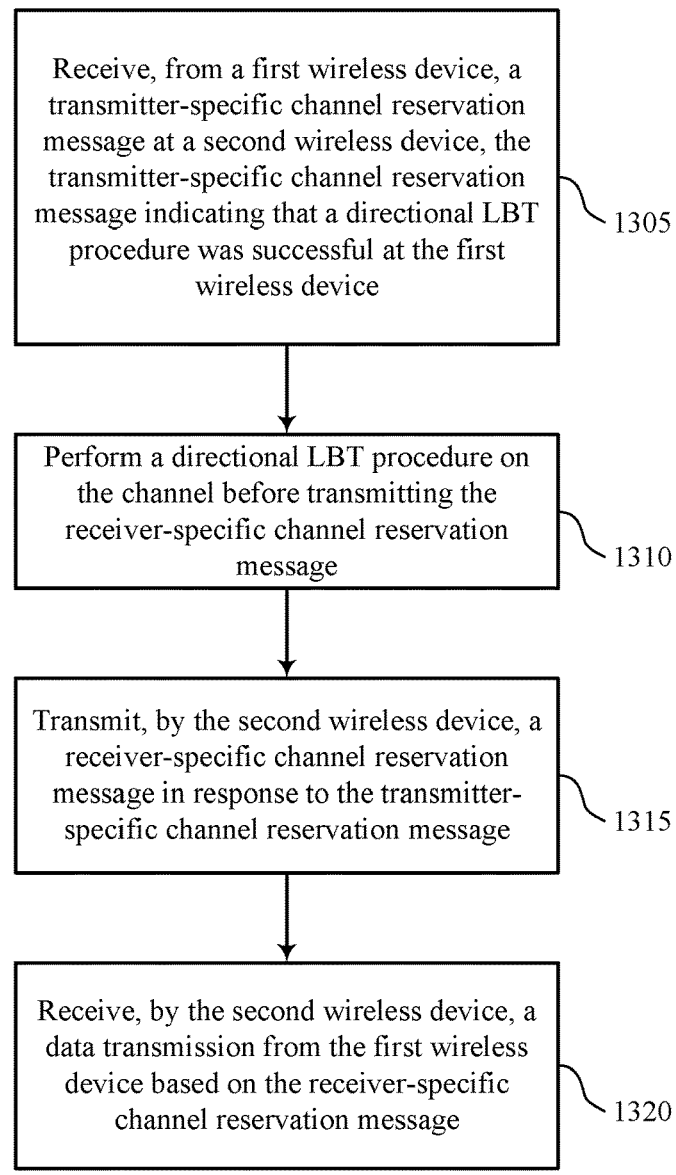

FIG. 13 shows a flowchart illustrating a method 1300 for a directional LBT scheme in accordance with various aspects of the present disclosure. The operations of method 1300 may be implemented by a UE 115 or base station 105 or its components as described herein. For example, the operations of method 1300 may be performed by a LBT scheme manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive, from a first wireless device, a transmitter-specific channel reservation message at a second wireless device, the transmitter-specific channel reservation message indicating that a directional listen-before-talk (LBT) procedure was successful at the first wireless device. The operations of block 1305 may be performed according to the methods described with reference to FIGS. 1 through 4. In certain examples, aspects of the operations of block 1305 may be performed by a channel reservation manager as described with reference to FIGS. 5 through 7.

At block 1310 the UE 115 or base station 105 may perform a directional LBT procedure on the channel before transmitting the receiver-specific channel reservation message. The operations of block 1310 may be performed according to the methods described with reference to FIGS. 1 through 4. In certain examples, aspects of the operations of block 1310 may be performed by a channel monitoring manager as described with reference to FIGS. 5 through 7.

At block 1315 the UE 115 or base station 105 may transmit, by the second wireless device, a receiver-specific channel reservation message in response to the transmitter-specific channel reservation message. The operations of block 1315 may be performed according to the methods described with reference to FIGS. 1 through 4. In certain examples, aspects of the operations of block 1315 may be performed by a channel reservation manager as described with reference to FIGS. 5 through 7.

At block 1320 the UE 115 or base station 105 may receive, by the second wireless device, a data transmission from the first wireless device based at least in part on the receiver-specific channel reservation message. The operations of block 1320 may be performed according to the methods described with reference to FIGS. 1 through 4. In certain examples, aspects of the operations of block 1320 may be performed by a data transmission manager as described with reference to FIGS. 5 through 7.

Figure 14:
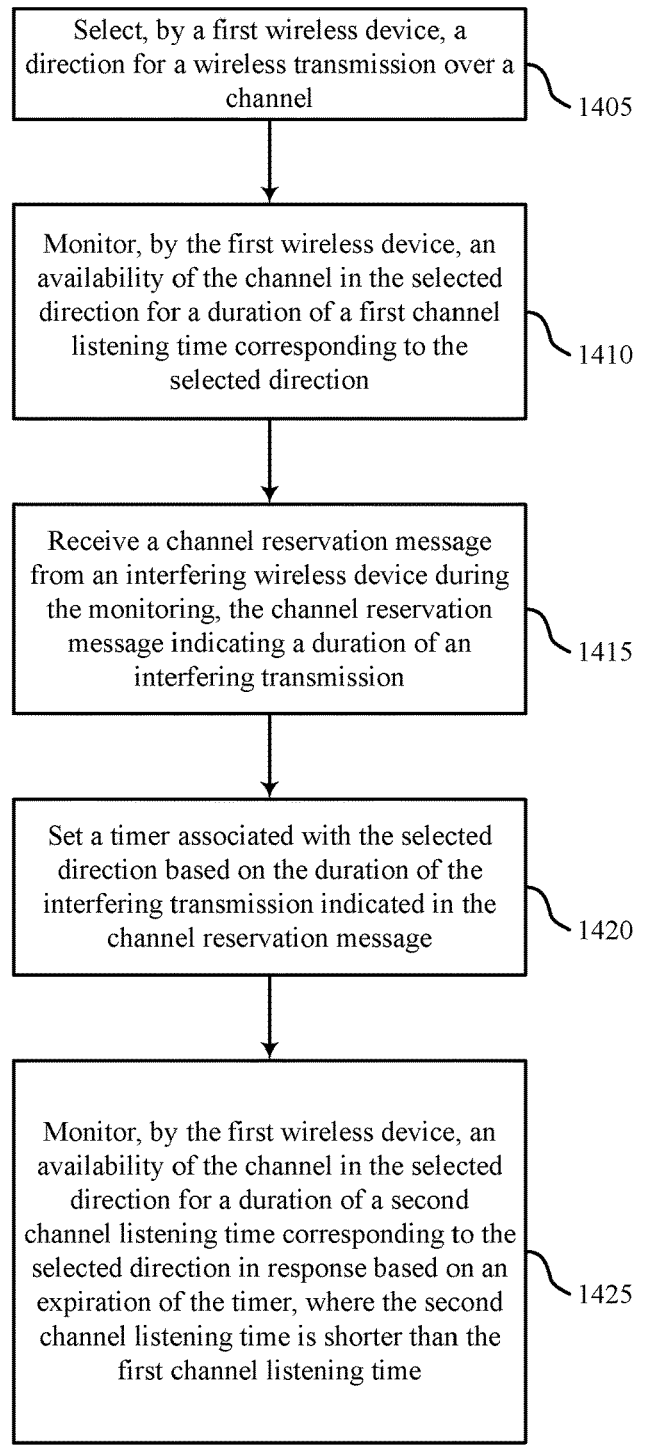

FIG. 14 shows a flowchart illustrating a method 1400 for a directional LBT scheme in accordance with various aspects of the present disclosure. The operations of method 1400 may be implemented by a UE 115 or base station 105 or its components as described herein. For example, the operations of method 1400 may be performed by a LBT scheme manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may select, by a first wireless device, a direction for a wireless transmission over a channel. The operations of block 1405 may be performed according to the methods described with reference to FIGS. 1 through 4. In some examples, aspects of the operations of block 1405 may be performed by a direction selection manager as described with reference to FIGS. 5 through 7.

At block 1410 the UE 115 or base station 105 may monitor, by the first wireless device, an availability of the channel in the selected direction for a duration of a first channel listening time corresponding to the selected direction. The operations of block 1410 may be performed according to the methods described with reference to FIGS. 1 through 4. In some examples, aspects of the operations of block 1410 may be performed by a channel monitoring manager as described with reference to FIGS. 5 through 7.

At block 1415 the UE 115 or base station 105 may receive a channel reservation message from an interfering wireless device during the monitoring, the channel reservation message indicating a duration of an interfering transmission. The operations of block 1415 may be performed according to the methods described with reference to FIGS. 1 through 4. In some examples, aspects of the operations of block 1415 may be performed by a channel reservation manager as described with reference to FIGS. 5 through 7.

At block 1420 the UE 115 or base station 105 may set a timer associated with the selected direction based on the duration of the interfering transmission indicated in the channel reservation message. The operations of block 1420 may be performed according to the methods described with reference to FIGS. 1 through 4. In some examples, aspects of the operations of block 1420 may be performed by a channel reservation manager as described with reference to FIGS. 5 through 7.

At block 1425 the UE 115 or base station 105 may monitor, by the first wireless device, an availability of the channel in the selected direction for a duration of a second channel listening time corresponding to the selected direction in response based at least in part on an expiration of the timer, where the second channel listening time is shorter than the first channel listening time. The operations of block 1425 may be performed according to the methods described with reference to FIGS. 1 through 4. In some examples, aspects of the operations of block 1425 may be performed by a channel monitoring manager as described with reference to FIGS. 5 through 7.

Figure 15:
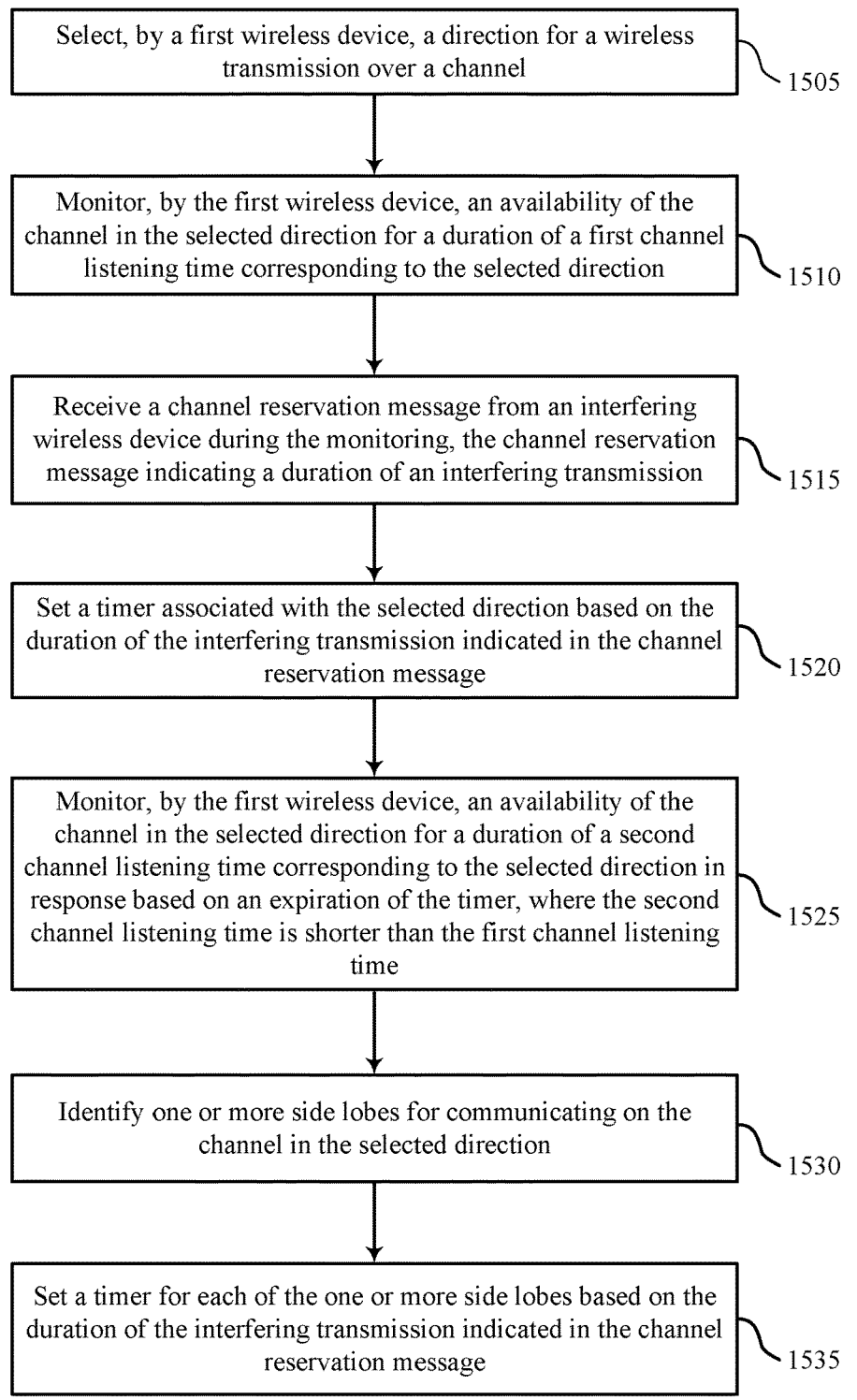

FIG. 15 shows a flowchart illustrating a method 1500 for a directional LBT scheme in accordance with various aspects of the present disclosure. The operations of method 1500 may be implemented by a UE 115 or base station 105 or its components as described herein. For example, the operations of method 1500 may be performed by a LBT scheme manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may select, by a first wireless device, a direction for a wireless transmission over a channel. The operations of block 1505 may be performed according to the methods described with reference to FIGS. 1 through 4. In some examples, aspects of the operations of block 1505 may be performed by a direction selection manager as described with reference to FIGS. 5 through 7.

At block 1510 the UE 115 or base station 105 may monitor, by the first wireless device, an availability of the channel in the selected direction for a duration of a first channel listening time corresponding to the selected direction. The operations of block 1510 may be performed according to the methods described with reference to FIGS. 1 through 4. In some examples, aspects of the operations of block 1510 may be performed by a channel monitoring manager as described with reference to FIGS. 5 through 7.

At block 1515 the UE 115 or base station 105 may receive a channel reservation message from an interfering wireless device during the monitoring, the channel reservation message indicating a duration of an interfering transmission. The operations of block 1515 may be performed according to the methods described with reference to FIGS. 1 through 4. In some examples, aspects of the operations of block 1515 may be performed by a channel reservation manager as described with reference to FIGS. 5 through 7.

At block 1520 the UE 115 or base station 105 may set a timer associated with the selected direction based on the duration of the interfering transmission indicated in the channel reservation message. The operations of block 1520 may be performed according to the methods described with reference to FIGS. 1 through 4. In some examples, aspects of the operations of block 1520 may be performed by a channel reservation manager as described with reference to FIGS. 5 through 7.

At block 1525 the UE 115 or base station 105 may monitor, by the first wireless device, an availability of the channel in the selected direction for a duration of a second channel listening time corresponding to the selected direction in response based at least in part on an expiration of the timer, where the second channel listening time is shorter than the first channel listening time. The operations of block 1525 may be performed according to the methods described with reference to FIGS. 1 through 4. In some examples, aspects of the operations of block 1525 may be performed by a channel monitoring manager as described with reference to FIGS. 5 through 7.

At block 1530 the UE 115 or base station 105 may identify one or more side lobes for communicating on the channel in the selected direction. The operations of block 1530 may be performed according to the methods described with reference to FIGS. 1 through 4. In some examples, aspects of the operations of block 1530 may be performed by a direction selection manager as described with reference to FIGS. 5 through 7.

At block 1535 the UE 115 or base station 105 may set a timer for each of the one or more side lobes based on the duration of the interfering transmission indicated in the channel reservation message. The operations of block 1535 may be performed according to the methods described with reference to FIGS. 1 through 4. In some examples, aspects of the operations of block 1535 may be performed by a channel reservation manager as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects a LTE or a NR system may be described for purposes of example, and LTE or NR terminology may be used in much of the description, the techniques described herein are applicable beyond LTE or NR applications.

In LTE/LTE-A networks, including such networks described herein, the term eNB may be used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   selecting, by a first wireless device, a direction for a wireless transmission over a channel;
   monitoring, by the first wireless device, an availability of the channel in the selected direction for a duration of a first channel listening time corresponding to the selected direction;
   determining that the channel is available in the selected direction based at least in part on either an absence of channel reservation messages during the monitoring or a first channel reservation message received during the monitoring, the first channel reservation message indicating a permissibility of a simultaneous transmission by the first wireless device in the selected direction; and
   transmitting, by the first wireless device, a second channel reservation message to a second wireless device over the channel in the selected direction based at least in part on the determination that the channel is available in the selected direction.

2. The method of claim 1, wherein the second channel reservation message comprises at least one of a duration parameter for a subsequent data transmission, a power headroom parameter indicative of a transmit power for the subsequent data transmission, or combinations thereof.

3. The method of claim 1, further comprising:
   receiving a third channel reservation message from the second wireless device on the channel in the selected direction in response to the second channel reservation message, wherein the third channel reservation message comprises at least one of a duration parameter associated with a subsequent data transmission, a transmit power level indicator for the third channel reservation message, an acceptable interference level indicator for the second wireless device, or a combination thereof.

4. The method of claim 3, further comprising:
   transmitting, based at least in part on receiving the third channel reservation message, a data transmission to the second wireless device.

5. The method of claim 3, further comprising:
   determining, based at least in part on the acceptable interference level indicator, an acceptable transmit power level for the subsequent data transmission.

6. The method of claim 1, further comprising:
   determining, based at least in part on the determination that the channel is available in the selected direction, a duration of a second channel listening time to monitor for a subsequent availability of the channel in the selected direction, wherein the duration of the second channel listening time is less than the duration of the first channel listening time.

7. The method of claim 1, wherein the duration of the first channel listening time is based at least in part on a data transmission interval associated with the channel.

8. The method of claim 1, further comprising:
   determining, based at least in part on the monitoring, that the channel is not available in the selected direction; and
   refraining from transmitting the second channel reservation message.

9. The method of claim 8, further comprising:
   determining that a duration of a second channel listening time of a second channel in a second direction is less than the duration of the first channel listening time, wherein the second channel in the second direction is the same as the first channel in a first direction with respect to one of frequency and bandwidth; and
   monitoring, by the first wireless device, an availability of the second channel in the second direction for the duration of the second channel listening time.

10. A method for wireless communication, comprising:
    selecting, by a first wireless device, a direction for a wireless transmission over a channel;
    monitoring, by the first wireless device, an availability of the channel in the selected direction for a duration of a first channel listening time corresponding to the selected direction;
    receiving a channel reservation message from an interfering wireless device during the monitoring, the channel reservation message indicating a duration of an interfering transmission;
    setting a timer associated with the selected direction based at least in part on the duration of the interfering transmission indicated in the channel reservation message; and
    monitoring, by the first wireless device, an availability of the channel in the selected direction for a duration of a second channel listening time corresponding to the selected direction in response based at least in part on an expiration of the timer, wherein the second channel listening time is shorter than the first channel listening time.

11. The method of claim 10, further comprising:
    determining the duration of the first channel listening time and the second channel listening time based at least in part on a data transmission interval associated with the channel.

12. The method of claim 10, further comprising:
    determining, based at least in part on the indicated duration, an end time for the interfering transmission; and
    setting the timer to expire at the end time for the interfering transmission.

13. The method of claim 10, further comprising:
    identifying one or more side lobes for communicating on the channel in the selected direction; and
    setting a timer for each of the one or more side lobes based at least in part on the duration of the interfering transmission indicated in the channel reservation message.

14. The method of claim 10, further comprising:
    determining the duration of the first channel listening time and the second channel listening time based at least in part on a data exchange interval associated with the channel, the data exchange interval comprising an exchange of channel reservation messages.

15. The method of claim 14, further comprising:
determining the duration of one or both of the first channel listening time and the second channel listening time based at least in part on a random time period selected according to a channel reservation message collision avoidance scheme.

16. An apparatus for wireless communication, in a system comprising:
a processor;
memory in electronic communication with the processor; and
instructions stored in the memory and operable, when executed by the processor, to cause the apparatus to:
select, by a first wireless device, a direction for a wireless transmission over a channel;
monitor, by the first wireless device, an availability of the channel in the selected direction for a duration of a first channel listening time corresponding to the selected direction;
determine that the channel is available in the selected direction based at least in part on either an absence of channel reservation messages during the monitoring or a first channel reservation message received during the monitoring, the first channel reservation message indicating a permissibility of a simultaneous transmission by the first wireless device in the selected direction; and
transmit, by the first wireless device, a second channel reservation message to a second wireless device over the channel in the selected direction based at least in part on the determination that the channel is available in the selected direction.

17. The apparatus of claim 16, wherein the second channel reservation message comprises at least one of a duration parameter for a subsequent data transmission, a power headroom parameter indicative of a transmit power for the subsequent data transmission, or combinations thereof.

18. The apparatus of claim 16, wherein the instructions are further executable by the processor to:
receive a third channel reservation message from the second wireless device on the channel in the selected direction in response to the second channel reservation message, wherein the third channel reservation message comprises at least one of a duration parameter associated with a subsequent data transmission, a transmit power level indicator for the third channel reservation message, an acceptable interference level indicator for the second wireless device, or combinations thereof.

19. The apparatus of claim 18, wherein the instructions are further executable by the processor to:
transmit, based at least in part on receiving the third channel reservation message, a data transmission to the second wireless device.

20. The apparatus of claim 18, wherein the instructions are further executable by the processor to:
determine, based at least in part on the acceptable interference level indicator, an acceptable transmit power level for the subsequent data transmission.

21. The apparatus of claim 16, wherein the instructions are further executable by the processor to:
determine, based at least in part on the determination that the channel is available in the selected direction, a duration of a second channel listening time to monitor for a subsequent availability of the channel in the selected direction, wherein the duration of the second channel listening time is less than the duration of the first channel listening time.

22. The apparatus of claim 16, wherein the duration of the first channel listening time is based at least in part on a data transmission interval associated with the channel.

23. The apparatus of claim 16, wherein the instructions are further executable by the processor to:
determine, based at least in part on the monitoring, that the channel is not available in the selected direction; and
refrain from transmitting the second channel reservation message.

24. The apparatus of claim 23, wherein the instructions are further executable by the processor to:
determine that a duration of a second channel listening time of a second channel in a second direction is less than the duration of the first channel listening time, wherein the second channel in the second direction is the same as the first channel in a first direction with respect to one of frequency and bandwidth; and
monitor, by the first wireless device, an availability of the second channel in the second direction for the duration of the second channel listening time.

25. An apparatus for wireless communication, in a system comprising:
a processor;
memory in electronic communication with the processor; and
instructions stored in the memory and operable, when executed by the processor, to cause the apparatus to:
select, by a first wireless device, a direction for a wireless transmission over a channel;
monitor, by the first wireless device, an availability of the channel in the selected direction for a duration of a first channel listening time corresponding to the selected direction;
receive a channel reservation message from an interfering wireless device during the monitoring, the channel reservation message indicating a duration of an interfering transmission;
set a timer associated with the selected direction based at least in part on the duration of the interfering transmission indicated in the channel reservation message; and
monitor, by the first wireless device, an availability of the channel in the selected direction for a duration of a second channel listening time corresponding to the selected direction in response based at least in part on an expiration of the timer, wherein the second channel listening time is shorter than the first channel listening time.

26. The apparatus of claim 25, wherein the instructions are further executable by the processor to:
determine the duration of the first channel listening time and the second channel listening time based at least in part on a data transmission interval associated with the channel.

27. The apparatus of claim 25, wherein the instructions are further executable by the processor to:
determine, based at least in part on the indicated duration, an end time for the interfering transmission; and
set the timer to expire at the end time for the interfering transmission.

28. The apparatus of claim 25, wherein the instructions are further executable by the processor to:
identify one or more side lobes for communicating on the channel in the selected direction; and set a timer for each of the one or more side lobes based at least in part on the duration of the interfering transmission indicated in the channel reservation message.

29. The apparatus of claim 25, wherein the instructions are further executable by the processor to:
determine the duration of the first channel listening time and the second channel listening time based at least in part on a data exchange interval associated with the channel, the data exchange interval comprising an exchange of channel reservation messages.

30. The apparatus of claim 29, wherein the instructions are further executable by the processor to:
determine the duration of one or both of the first channel listening time and the second channel listening time based at least in part on a random time period selected according to a channel reservation message collision avoidance scheme.

* * * * *